(12) United States Patent
Frye et al.

(10) Patent No.: US 6,919,516 B2
(45) Date of Patent: Jul. 19, 2005

(54) RF MULTIPLE LOAD CELL SCALE

(75) Inventors: Craig Frye, Boiling Springs, SC (US); Bruce Eldridge Huitt, Suwanee, GA (US)

(73) Assignee: Mettler-Toledo, Columbus, OH (US)

(*) Notice: Subject to any disclaimer, the term of this patent is extended or adjusted under 35 U.S.C. 154(b) by 241 days.

(21) Appl. No.: 09/912,009

(22) Filed: Jan. 8, 2002

(65) Prior Publication Data

US 2004/0026135 A1 Feb. 12, 2004

(51) Int. Cl.⁷ .................... G01G 9/00; G01G 19/00
(52) U.S. Cl. ................ 177/25.13; 177/132; 177/134; 177/199; 340/666; 702/173
(58) Field of Search ................ 177/25.11–25.19, 177/136–141, 199, 200, 132–135; 702/173–175, 101, 102; 340/666; 73/1.13

(56) References Cited

U.S. PATENT DOCUMENTS

| | | | | |
|---|---|---|---|---|
| 4,804,052 A | * | 2/1989 | Griffen | 177/25.14 |
| 4,815,547 A | * | 3/1989 | Dillon et al. | 177/25.14 |
| 4,909,338 A | * | 3/1990 | Vitunic et al. | 177/50 |
| 4,969,112 A | * | 11/1990 | Castle | 177/25.13 |
| 4,992,775 A | * | 2/1991 | Castle et al. | 340/666 |
| 5,205,368 A | * | 4/1993 | Häfner | 177/163 |
| 5,650,930 A | * | 7/1997 | Hagenbuch | 177/141 |
| 5,780,782 A | * | 7/1998 | O'Dea | 177/50 |
| 5,878,376 A | * | 3/1999 | Schurr | 177/25.13 |
| 5,884,238 A | * | 3/1999 | Noll et al. | 702/173 |
| 5,912,439 A | * | 6/1999 | Eran et al. | 177/136 |
| 6,038,465 A | * | 3/2000 | Melton, Jr. | 177/25.19 |
| 6,555,766 B2 | * | 4/2003 | Breed et al. | 177/144 |
| 6,653,576 B2 | * | 11/2003 | Suzuki et al. | 177/25.13 |

OTHER PUBLICATIONS

David Cheng, "Field and Wave Electromagnetics", Addison-Wesley Publishing Co. (ISBN 0–201–01239–1), Mar. 1985, pp. 370, 371, 443, & 444.*

* cited by examiner

*Primary Examiner*—Randy W. Gibson
(74) *Attorney, Agent, or Firm*—Jeffrey Furr

(57) ABSTRACT

Load cells forming one or more weighing scales are connected to each other and to a common concentrator which communicates to a master controller in the control house via RF wireless communication. The load cells are polled by and provide weight reading to concentrator to the master controller. A digital load cell is used which includes a rocker pin, guided beam, torsion ring or other counterforce, a circuit board mounted on the counterforce and an enclosure sealing the circuit board and all but the load bearing surfaces of the counterforce and a mounded antenna. The circuit board includes a microcomputer and a transceiver. RF communication is provided with the circuit board through a antenna mounted on the enclosure. One or a number of load cells may be connected to a computer or controller to form one or more weighing scales with one or more weighing scales connect to a control house through wireless RF communication. The preferred embodiment uses passive receivers for receiving the signals and waveguide to minimize power requirements.

7 Claims, 35 Drawing Sheets

TE₁₀

RF MULTIPLE LOAD CELL SCALE

CROSS-REFERENCES TO RELATED APPLICATIONS (IF ANY)

None

STATEMENT AS TO RIGHTS TO INVENTIONS MADE UNDER FEDERALLY-SPONSORED RESEARCH AND DEVELOPMENT (IF ANY)

None

BACKGROUND

1. Field of the Invention

This invention relates to weighing apparatus and, more particularly, to weighing apparatus utilizing multiple load cells and RF (radio frequency) to communicate, 2. Description of Prior Art Many weighing applications require the use of multiple load cells in a single scale or in a number of associated scales. For example, a heavy capacity scale for weighing trucks or railroad cars requires multiple load cells. Each load cell provides an analog signal proportional to the portion of the load borne by that load cell. Strain gages connected in a wheatstone bridge configuration often provide the analog signal. In heavy capacity applications, the load is distributed over usually at least four load cells and some applications may require sixteen or more load cells. The sum of the load cell output signals must be obtained to provide a signal representative of the total weight applied to the scale.

The weight accuracy of multiple load cell scales depends not only on the accuracy of the individual cells, but also on the mechanical and electrical interection among them. Since the load cells usually have different sensitivities to applied loads the total scale output is usually dependent upon the position of the weight on the scale. The outputs of the individual cells must therefore be compensated or adjusted so that the total scale output remains substantially the same for a given load no matter where on the scale it is positioned. Such load position compensation has usually been accomplished by connecting sensitivity reducing resistors in the wheatstone bridge circuit of the individual load cells, usually across the output of the bridge circuit. U.S. Pat. Nos. 4,261,195 to Lockery, 4,574,899 to Griffen, and 4,556,115 to Lockery address the problem of load position compensation in multi-load cell scales.

A large capacity weigh scale usually consists of multiple load cells. Typically a rocker pin, guided beam, torsion ring type load cell is used. U.S. Pat. No. 4,815,547 to Griffen, et al. discloses a typical rocker pin with a printed circuit board attached. A principal advantage of the rocker pin is that it can be made self-erecting, that is, so that when the normally upright pin is deflected about its base or grounded end, the pin will return to its upright position when the deflecting load is removed. The self-erecting feature is an advantage in weighing applications in which temporary side loads are encountered. The self-erecting feature is obtained by configuring the pin so that the radius of curvature of each end surface is greater than half the total height of the pin.

In the present art, there is a need for anti-rotation methods for the load cells, as the rotation of the load cell would produce wear on the load cell and stress on the cables. One methods that are used is the use of hexes on the heads of the load cell pins. Hexes are used so that the load cell will not rotate. Since the load cell cannot rotate, the wear on the load cell is not distributed evenly.

Recently, there has appeared the so-called "digital load cell" in which an analog-to-digital converter and microprocessor are dedicated to a single load cell. The electronic circuits are mounted on a printed circuit board connected directly to the counterforce. This development has permitted digital correction of various load cell inaccuracies When the analog circuits of the load cells are connected together, they are essentially impossible to monitor individually. Thus, "trouble shooting" or repair of a scale, can require disassembly of the electrical circuits in order to test the load cells individually and find the defective one. Further, when a load cell is replaced for any reason, the scale often requires recompensation for load position. A known test weight is required to accomplish this recompensation. For large scales in particular this is a time consuming procedure, and the known weight is often inconvenient to obtain. U.S. Pat. No. 4,804,052 to Griffen discloses such a compensated multiple load cell.

The current art of large capacity weigh scales has armored cables to provide the electrical interaction between the individual load cells and the controller. There are also cables that run from the master controller to the control house. The cables are expensive and subject to being damaged, being pinched, being eaten by rodents, and failing. The cables tend to break down due to weather changes. This requires the scale to be repaired at heavy cost. This also means that the scale can be down for long periods of time. In the present art, if all cables are inter-connected and if a cable breaks in one spot, the whole system could be dead. There is a large risk to the scale due to lightening damage because of the wiring in the scale. There is also risk of power interruption to the large capacity scale, which would shut down the ability to use the scale. If the power cable to the controller is down, then the whole scale will be down. There is also a limitation on the control house based on the need to run cables from the control house to the scale. The terrain and distance must be taken into account.

There is still room for improvement within the art.

1. Field of the Invention

U.S. Class 177-25.14

2. Description of Related Art Including Information Disclosed Under 37 CFR § 1.97**>and 1.98<.

SUMMARY OF THE INVENTION

It is a general object of the present invention to substantially eliminate the problems described above associated with connecting together multiple load cells through the use of cable or wiring. A more particular object is to provide RF communication between the individual load cells, the controller and the control house.

Weighing apparatus, according to one aspect of the present invention, includes a rocker pin counterforce in the form of a monolithic column which has a curved loading surface at each end. The load cell requires no physical adjustment within the enclosure after manufacture and can be controlled and corrected using the signal path through the enclosure. A number of such modular load cells in one or more scales can be connected to a common controller. Each load cell will have its own power source and a means to transmit and possibly receive information through RF transmissions. The load cells will communicate with the controller. The controller will use a communication means, possibly a wireless modem, to transmit to the control house. The controller will also have its own power source to eliminate the need for power cables.

Preferably, each load cell is a digital load cell, which includes a dedicated A/D convertor and microcomputer and is connected through RF communications with the controller. Each associated load cell, under control of its own microcomputer, transceiver and the master controller, obtains digital weight readings of the load on the individual load cell and stores the data in memory associated with its own microcomputer. The controller polls the associated load cells and receives weight data from them.

The connection of the load cell to provide digital weight data eliminates the problem encountered when connecting together the analog electrical portions of load cells. Because the load cells are not interactive, load position compensation can be achieved in a single, rather iterative procedure. Also, compensation can be achieved without the need for a test weight of known value.

An aspect of this invention will use waveguides to steer RF energy within scale deck structure. At the frequencies of interest (990 MHz to 2.5 GHz), waveguides are reasonably sized (1=33 cm to 12.5 cm, respectively). Channeling the RF energy between all cells is possible. Waveguides must be environmentally sealed, yet RF permeable at the ends. Waveguides could be integrated into the scale structure and would offer a pathway for RF energy and protection from external RF interference.

BRIEF DESCRIPTION OF THE DRAWING

Without restricting the full scope of this invention, the preferred form of this invention is illustrated in the following drawings:

FIGS. 17A to 17M are a flow chart illustrating the operation of the interaction of the load cells and master controller.

DESCRIPTION

Preferred Embodiment

The preferred embodiment of the invention is a weighing platform connected to a control house via a wireless RF connection. The preferred embodiment is a multiple load cell configuration.

Figure 1:
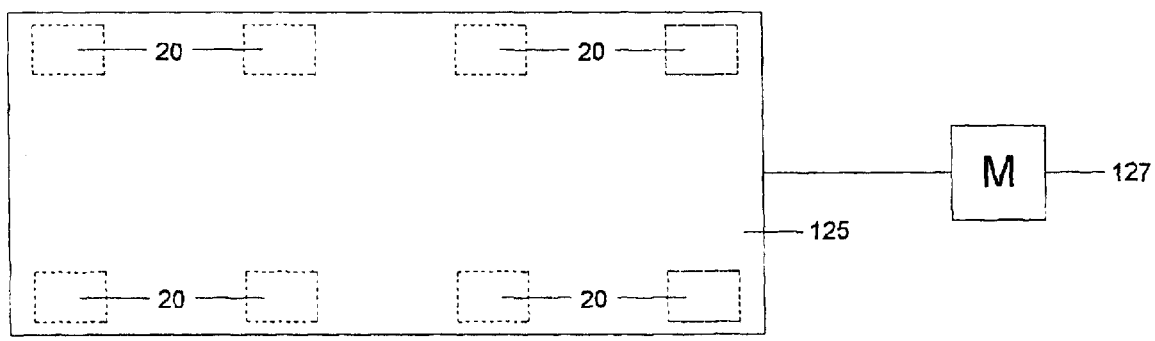
FIG. 1 is a plan view of the weighing platform embodying the present invention.
Figure 2:
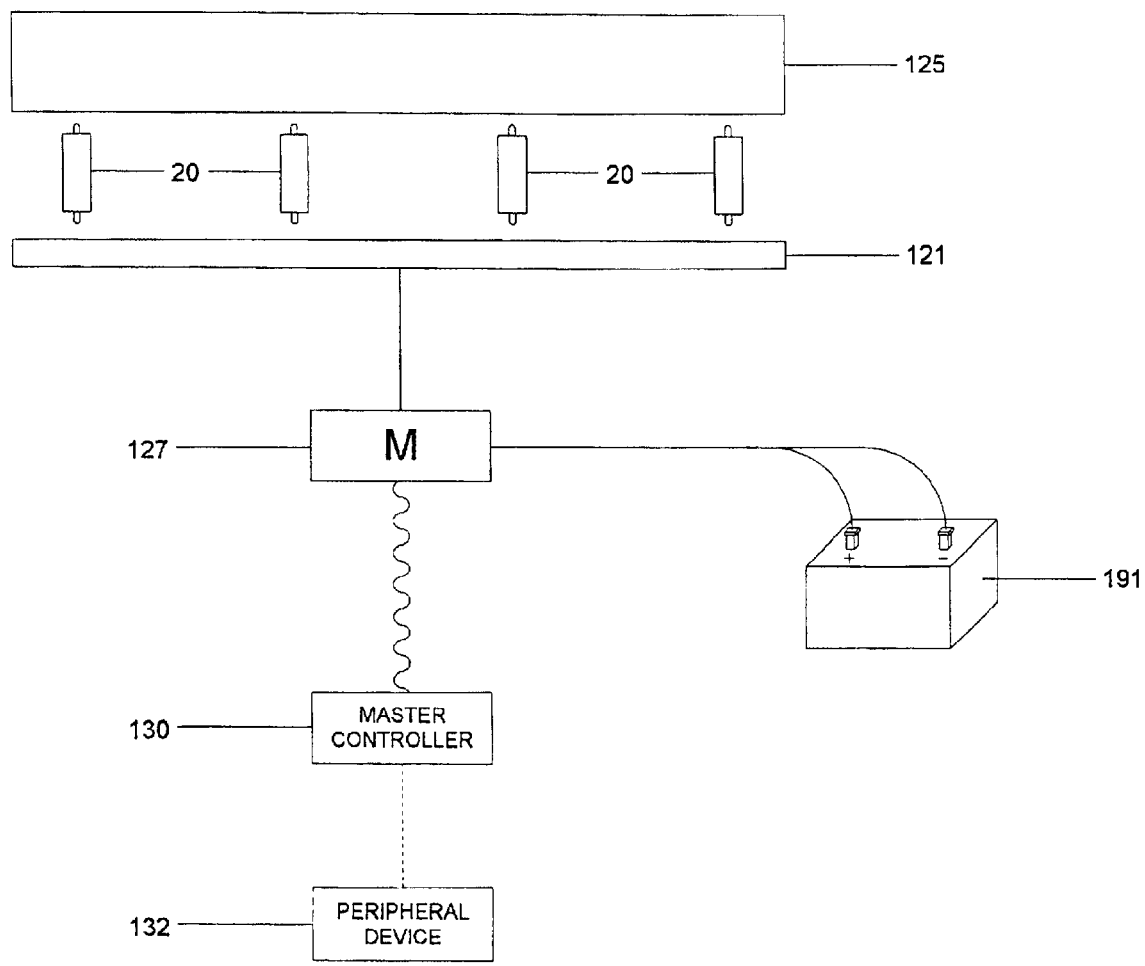
FIG. 2 is a side view of the weighing platform embodying the present invention.

Referring to FIGS. 1 and 2, there is shown a configured as a single scale for weighing vehicles. The system includes eight digital load cells 20 on the scale deck structure 121 supporting a platform 125 suitable for holding a vehicle such as a truck. The load cells 20 are connected together through a junction box 127 and through RF transmission to a master controller 130. The master controller may be connected to one or more peripheral devices 132 such as a printer or host computer. The digital load cells 20, junction box/concentrator 127 and master controller 130 are arranged and programmed with junction box/concentrator 127 performing as the master and the load cells 20 as slaves The junction box/concentrator 127 transmits to the master controller 130. The junction box/concentrator 127 is connected to the master controller 130 in the control house 500 through the use of a standard RF modem 133 defined further below.

The connection of the digital load cells 20 to each other and to junction box/concentrator 127 through RF-transmissions provides the basis for in which communication can occur between the individual load cells 20 and junction box/concentrator 127. The junction box/concentrator 127 communicates with the master controller 130 through RF communications. The master controller 130 is usually contained in the control house 500.

In the system, junction box/concentrator 127 acts as the master and the individual load cells 20 as slaves incapable of initiating communication with the junction box/concentrator 127. Junction box/concentrator 127 polls the load cells 20 (slaves) or selected load cells 20 as required. The load cells 20 respond by transmitting data or requesting information from the junction box/concentrator 127.

In the arrangement of FIG. 1, each group one or more digital load cells may constitute an individual scale so that the combined output of all load cells 20 in the group represents relevant weight data to be gathered and operated on by master controller 130. An example of such an application would be the assignment of each group to weigh one particular tank or bin, which could then be monitored and controlled by master controller 130 through the junction box/concentrator 127. In another application, all of the load cells 20 could be in the same scale, for example distributed at selected points beneath the platform of a vehicle scale or other scale utilizing a platform for weighing.

In the case of a single scale, junction box/concentrator 127 polls all load cells 20 periodically and sums the weight data to obtain the weight of the object on the platform 125. In the case of multiple scales, the system deals with only one scale at a time, as during a transfer of material into or out of the tank or bin. Junction box/concentrator 127 need poll only the load cells 20 of the particular scale and only when required.

A large capacity weigh scale 1 usually consists of multiple load cells 20. Typically a rocker pin, guided beam, torsion ring type load cell is used. U.S. Pat. No. 4,815,547 to Griffen, et al., which incorporated by reference, discloses a typical rocker pin with a printed circuit board attached.

Figure 3:
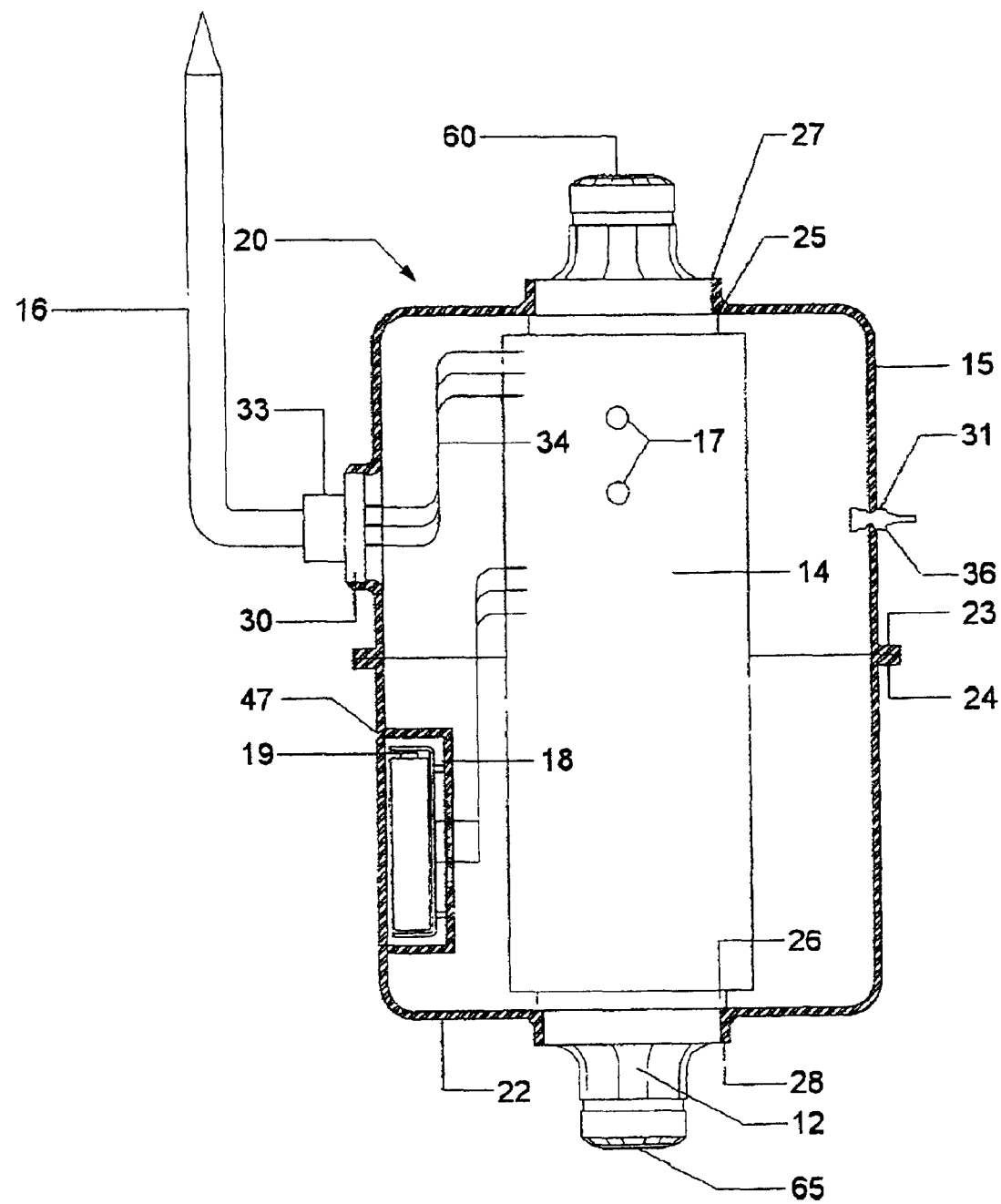
FIG. 3 is a vertical sectional view of a digital load cell employing a rocker pin counterforce according to the present invention.
Figure 4:
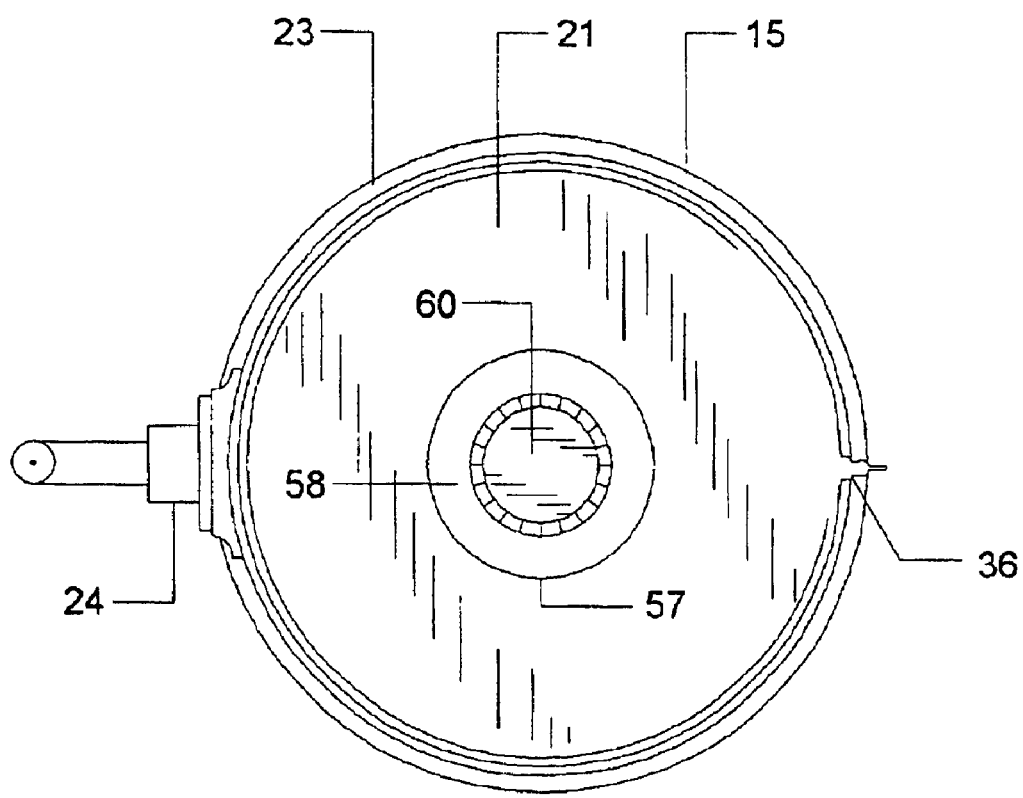
FIG. 4 is a top plan view of the load cell of FIG. 3.

Referring to FIGS. 3 and 4, the load cells include a rocker pin counterforce 12 of stainless steel or the like. These loads cells are similar in design to those disclosed in UA printed circuit board 14 is attached to the counterforce and an enclosure generally designated 15 encloses the board and most of the counterforce. Printed circuit board 14 contains the electronic circuits associated with the load cell including an analog-to-digital converter, transceiver and a microprocessor and is described more fully below. Printed circuit board 14 is secured to counterforce 12 by screws 17 extending through spacers into the body of the counterforce. The combination of counterforce, circuit board and enclosure produces the digital load cell generally designated 20.

Enclosure 15 is generally cylindrical and includes upper and lower bowl-like members 21 and 22, respectively, both preferably of stainless steel. Each member 21, 22 has at its open end a flange 23, 24, respectively, extending radially outwardly from the rim of the member. The flanges 23, 24 are welded together to join the upper and lower members. Central openings 25, 26 are provided in the closed ends of members 21, 22 through which extend the outer end portions of counterforce 12. Each member 21, 22 is welded at the periphery of openings 25, 26 to a shoulder on counterforce 12 as shown at 27, 28. Upper member 21 is provided with a pair of radial openings 30 and 31. An electrical connector 33 extend through opening 30 and is welded to the wall portion of member 21 that defines opening 30. The electrical connector 33 is connected to the load cell's antenna 16. Electrical wiring 34 from connector 33 extends within enclosure 15 to a connector on circuit board 14. Electrical wiring 34 also extends from the battery compartment 18 to a connector on the circuit board 14. A vent tube 36 extends through opening 31 and is fixed in place by brazing to the wall of member 21. Vent tube 36 allows the interior of enclosure 15 to be purged and then sealed from the external atmosphere by blocking the vent tube.

The circuit board 14 will contain a Low-Power UHF Transceiver 109 for the controlling the RF transmissions and receptions. Any commonly used, inexpensive transceiver may be used. An example is a XE1201 manufactured by XEMICS of Switzerland or a BethelTronix BT1073B.

Figure 5:
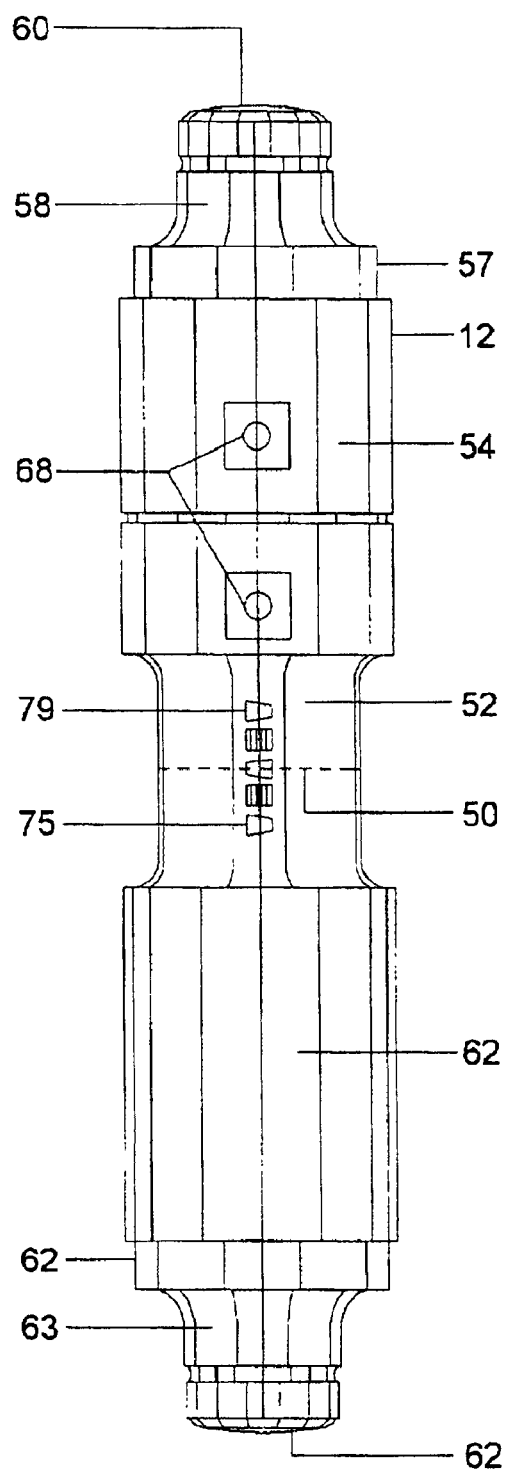
FIG. 5 is a front view of a rocker pin counterforce.
Figure 6:
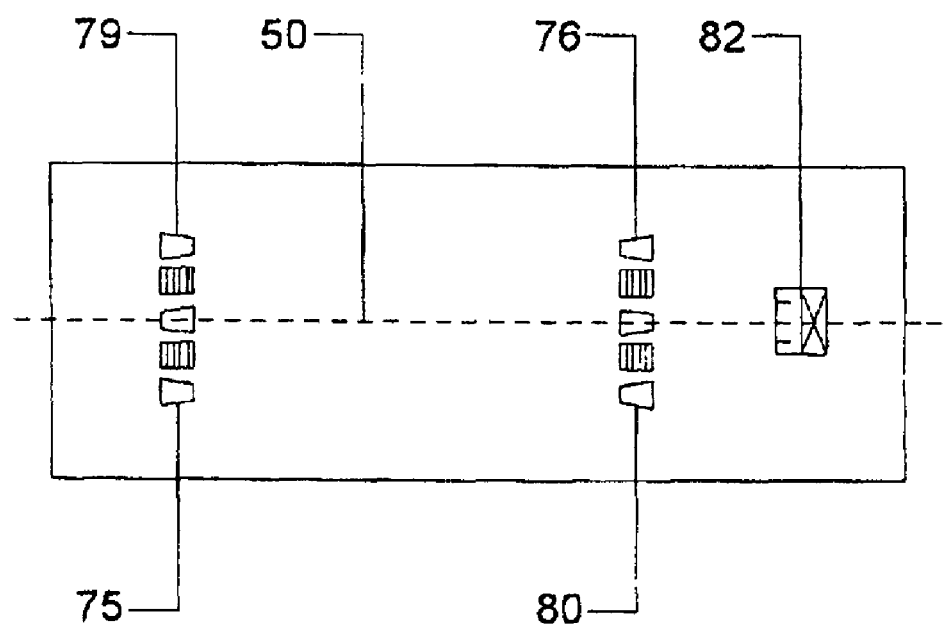
FIG. 6 is a developed view of the reduced diameter section of the counterforce of FIG. 3 showing the arrangement of strain gauges thereon.

Referring now to FIGS. 5 and 6, rocker pin counterforce 12 has the overall form of a cylindrical column symmetrical lengthwise about a transverse center line 50. A portion of a reduced diameter section 52 extends in each direction from center line 50 to merge with an upper body section 54 and a lower body section 55. An upper shoulder 57, to which upper enclosure member 21 is welded, extends from body section 54 to an upper neck 58 which terminates in an upper loading surface 60. Correspondingly, a lower shoulder 62, to which lower enclosure member 22 is welded, extends from body section 55 to a lower neck 63 which terminates in a lower loading surface 65. Each loading surface 60, 65 has a radius of curvature greater than one-half the total height of the rocker pin in order to make the pin self-erecting, that is, so that when supported on one loading surface 60, 65 it will return to an upright position when a force deflecting it from that position is removed. A pair of tapped holes 68 are provided in upper body section 54 for receipt of screws 17 to attach circuit board 14 to the counterforce. Counterforce 12 may be formed in a very cost-efficient manner from a right circular cylindrical rod or bar turned on a lathe with, except for holes 68, no requirement for drilling, tapping or other machining.

Reduced diameter section 52 on the counterforce provides a desired range of strain in that section when the rocker pin is under rated loads. A set of strain gauges and a temperature sensing resistor are arranged as shown in FIG. 6 on the periphery of reduced section 52. A pair of compression sensing strain gauges 75, 76 are mounted at diametrically opposite locations on reduced section 52 below and above, respectively, center line 50 with their strain sensing elements oriented lengthwise of the rocker pin to sense compressive strain produced by loads applied to loading surfaces 60, 65. A pair of tension sensitive strain gauges 79, 80 are mounted at the same diametrically opposite locations as compression gauges 75, 76 but on opposite sides of center line 50 from the compression gauges. The strain sensing elements of gauges 79 and 80 are generally aligned with transverse center line 50 to sense tensile strains manifested by an increase in the circumference of reduced section 52 when loading surfaces 60, 65 are loaded in compression. A temperature sensitive nickel resistor 82 is mounted on reduced section 52 midway between the two vertically aligned sets of strain gauges and aligned with transverse center line 50.

The load cell of FIGS. 3 to 6 is assembled by first connecting printed circuit board 14 to counterforce 12 by means of screws 17 and connection of wiring between the counterforce and the printed circuit board. Connector 33 and vent tube 36 are welded or brazed to upper enclosure member 21. The battery compartment opening 47 is form by removing material for the lower enclosure member 22. The battery compartment 18 is then welded or brazed to lower enclosure member 22. The counterforce and circuit board are fitted to upper enclosure member 21 and wiring connections are made between the circuit board and connector 33 and the battery contacts 19. Upper member 21 is welded to shoulder 57 on counterforce 12 as shown at 27. Lower enclosure member 22 is then fitted to upper member 21, and the two are welded together at flanges 23, 24. Lower member 22 is then welded to shoulder 62 on counterforce 12 as indicated at 28.

The assembly is then purged through vent tube 36 and the vent tube is crimped and welded closed to hermetically seal the electronic circuits and the non load-contacting portions of counterforce 12 within enclosure 15. The result is a hermetically sealed, self-contained digital load cell which can and must be adjusted, compensated and further characterized only through connector 33 which connects the load cell to the antenna 16. Accordingly, all analysis, corrections, and adjustments can be made from a remote location without physical intervention with the load cell. This permits the load cell to be a modular, interchangeable building block in a weighing system.

The rocker pin counterforce 12 with strain gages or other transducers mounted thereon may, of course, be used as a load cell without a digital circuit board attached and/or being enclosed with the board. Likewise, other forms of counterforce may be used to form the modular digital load cells.

In use, a load is applied to loading surfaces 60 and 65 which produces primarily compression strains parallel to the longitudinal axis of the rocker pin sensed by strain gages 75 and 76. Considerably less tensile strain is produced as radial expansion of reduced section 52. The tensile strain is sensed by gauges 79 and 80. Because the compressive strains are significantly larger than the tensile strains, the output of the bridge circuit formed by strain gauges 75, 76, 79 and 80 is substantially nonlinear. As mentioned above, this has been a significant disadvantage in the past in the use of columnar load cells.

Figure 7A:
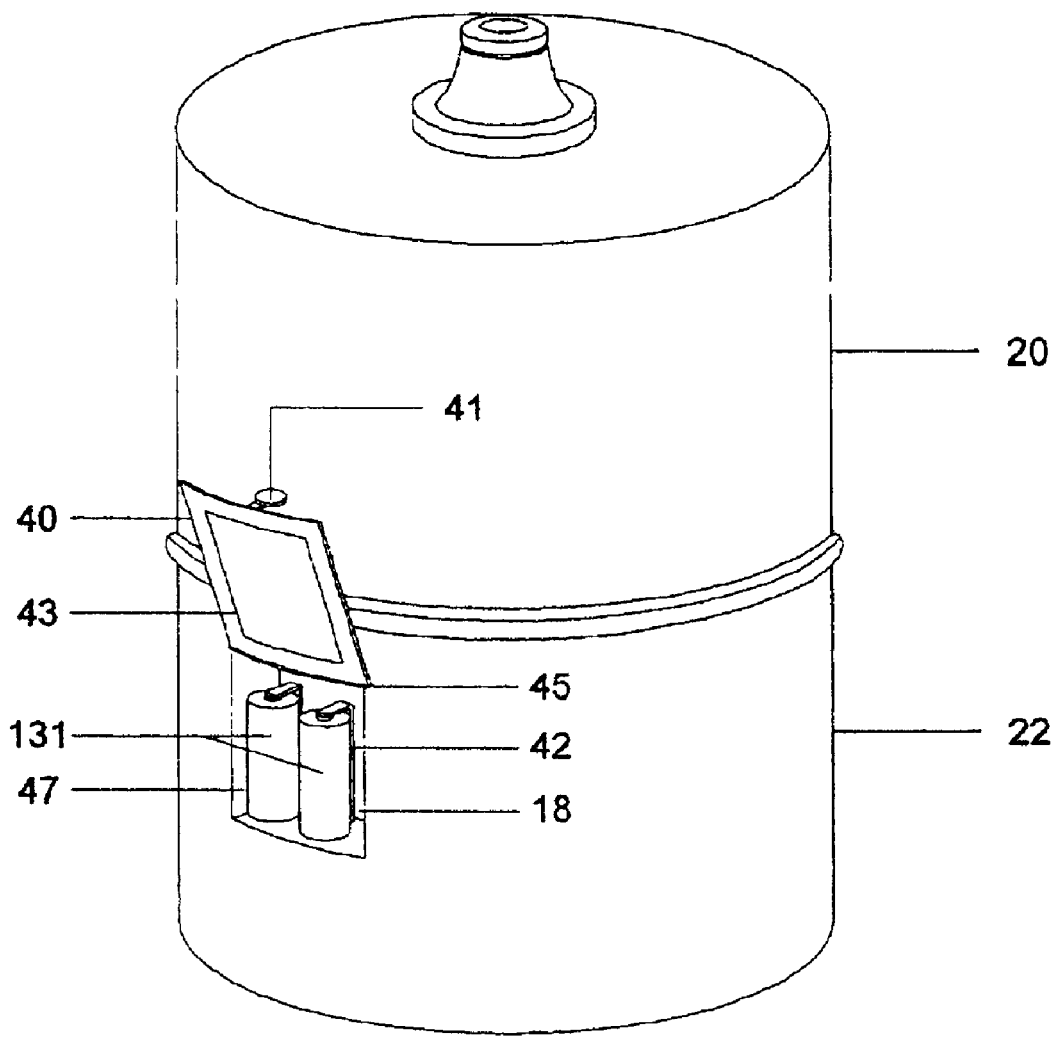
FIG. 7A is a side view of the battery and battery compartment of the load cell.
Figure 7B:
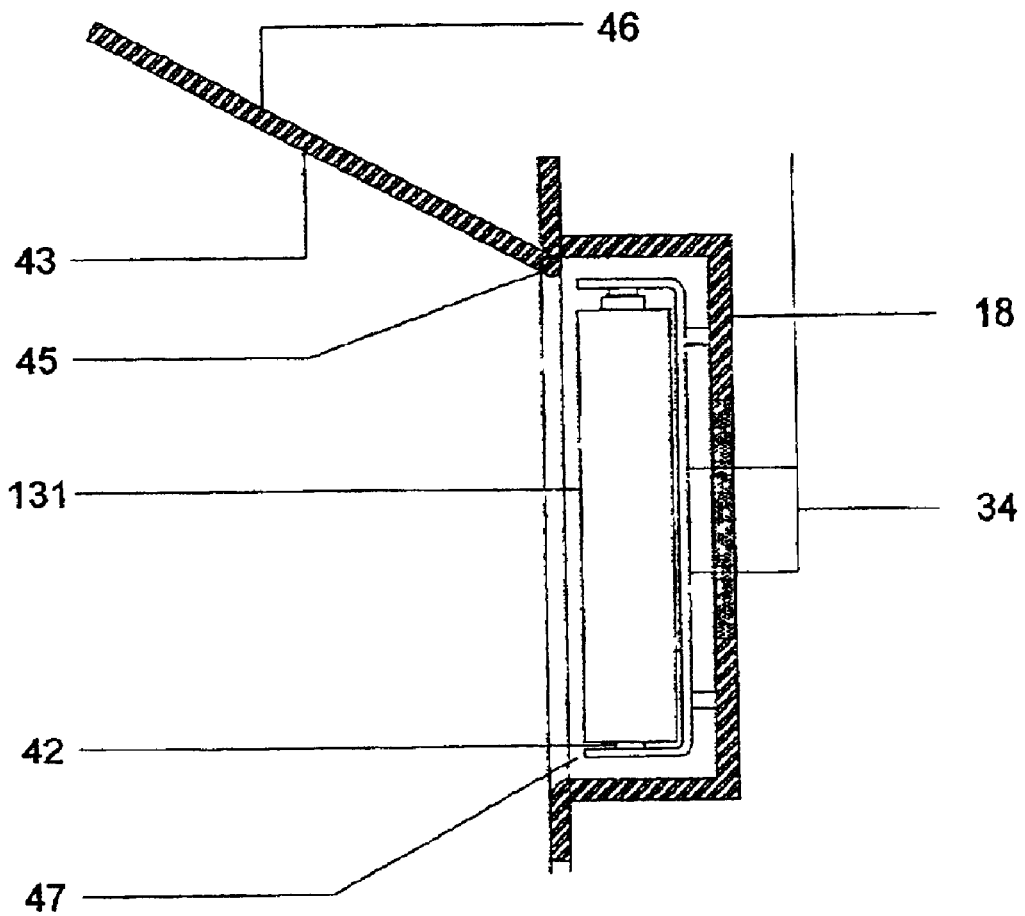
FIG. 7B is a cross view of the battery and battery compartment of the load cell.

Referring to FIG. 7A and FIG. 7B, there is a side view and crosscut view of the load cell batteries 131 and battery compartment 18 of the load cell 20. It has a cover 40 that has a hinge 45 on one side on which the cover turns and is closed by a screw 41. The screw 41 is used to limit tampering and to insure an airtight fit. The cover 40 is of the same thickness as the load cell lower enclosure member 22 and is of a dimension of 2" wide by 3" long and will be curved with the curve matching that of the lower enclosure member 22. A rubber gasket 43 is glued on the outer edges of the battery compartment cover 40 to help seal the battery compartment 18.

The battery 13 is to be mounted in a battery holder 42, such holders are common in the industry. The positive and negative wires will run from the battery holder 42 to a positive and negative connectors 19 respectively that are embedded within a glass plate that the sealed in the back wall of the battery compartment 18. This is to maintain the airtight seal of the load cell 20. The load cell batteries 131 in the preferred embodiment will be lithium vinyl chloride batteries with a the best battery being a 3.6 v@20 amp/hour with a transmission duty cycle of about 10% active RMS 6 ma.

Material is cut away from produce a battery compartment opening 47 in the lower encasement member 22 wall that is slightly smaller than the cover 40 approximately 1¾" by 2¾'. The edges around the opening will be indented for a better seal. The dimensions of the battery compartment will be just large enough to fit the batteries 13 and the battery container 42, approximately 3" long by 2" wide by 1" deep.

Figure 8A:
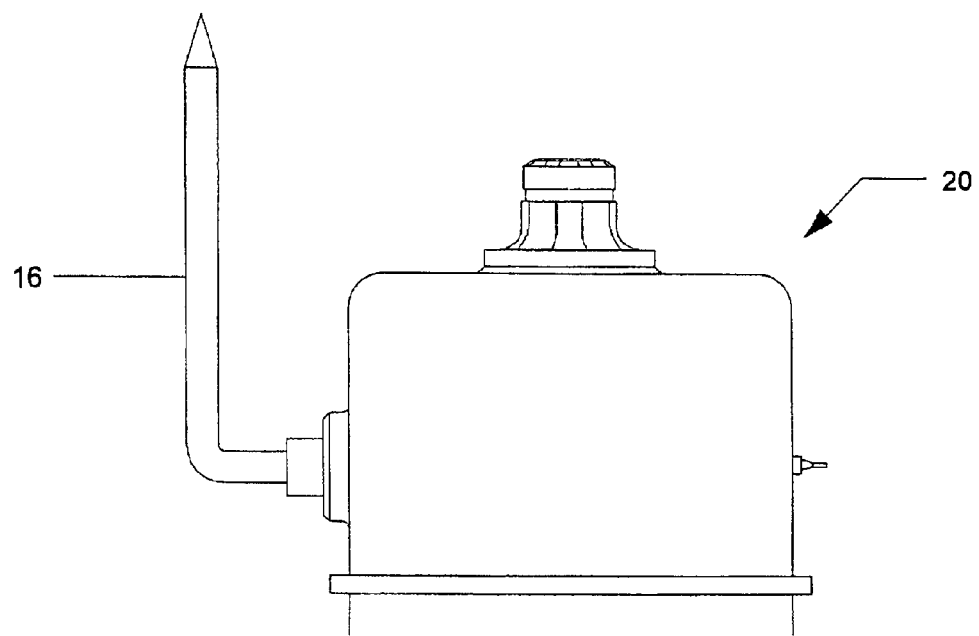
FIG. 8A is a side view of the antenna of the load cell.
Figure 8B:
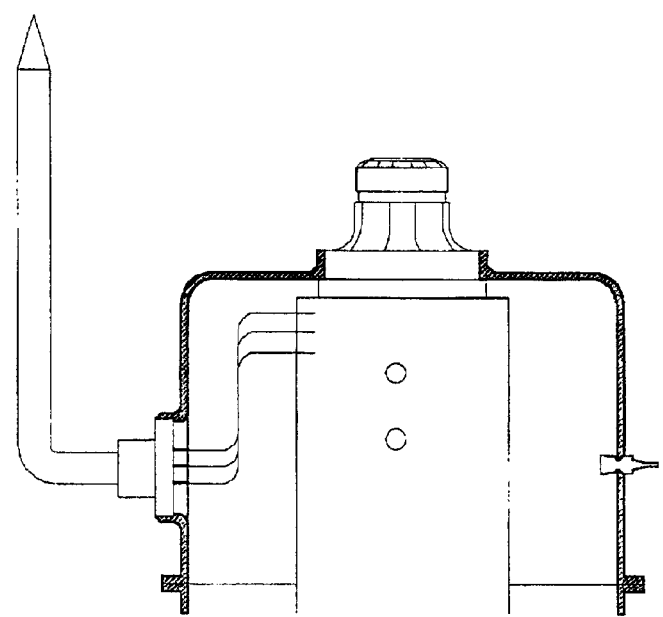
FIG. 8B is a cross view of the antenna of the load cell.

Referring to FIG. 8A and FIG. 8B which is a side view and crosscut view of the antenna 16 of the load cell 20 respectively. In the preferred embodiment, the antenna 16 that is to be used is any efficient compact antenna with good transmission and receiving capabilities, these are commonly know and available in the industry.

Figure 9:
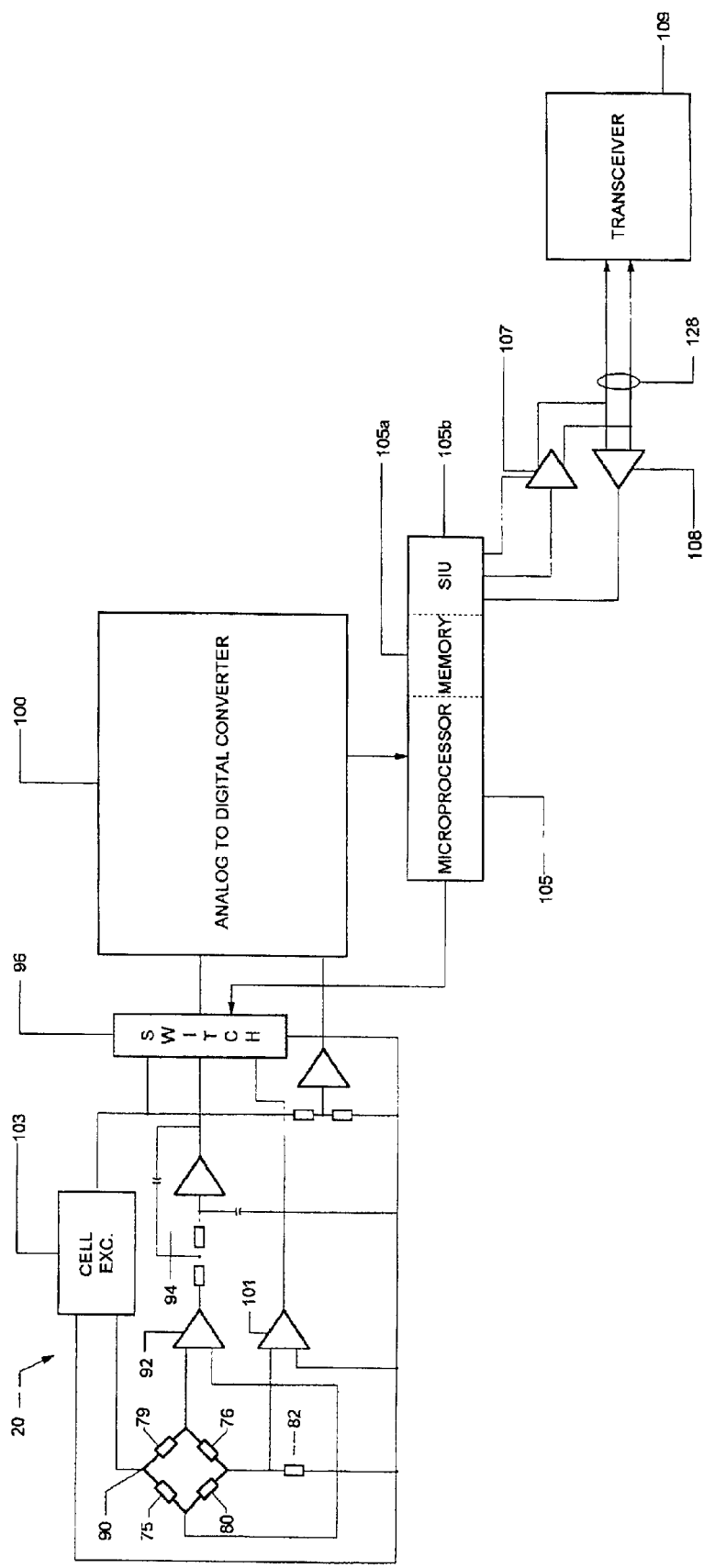
FIG. 9 is a block diagram of the electronic circuit of the digital load cell of FIGS. 3 through 6.

Referring now to FIG. 9, the electrical circuit of the digital load cell 20 of FIGS. 3 to 6 includes strain gauges 75, 76, 79 and 80 connected in the electrical bridge circuit 90. The bridge circuit provides an analog weight signal to a preamplifier 92. The weight signal from preamplifier 92 is coupled through an analog filter 94 to one input of an analog switch 96. The output of switch 96 is connected to the input of an analog-to-digital (A/D) converter 100. Nickel resistor 82 is connected in series with bridge circuit 90 and provides a signal through a preamplifier 101 to another input of analog switch 96. Excitation is provided to bridge circuit 90 by a power supply 103, which also provides a known reference voltage through analog switch 96 to multiple slope A/D 100. The output of A/D converter 100 is connected to a microprocessor 105, preferably an Intel 8051. Microprocessor 105 controls the operation of analog switch 96 to cause analog weight signals from bridge 90 and temperature indicating signals from nickel resistor 82 to be converted to digital form by A/D converter 100 and transmitted to microprocessor 105.

Microprocessor 105 is provided with memory 105a including ROM, EEPROM and RAM for storage of programs and of data received from A/D converter 100 and from a remote controller or computer. Microprocessor 105 is also equipped with a serial interface unit 105b connected through a driver 107 and a receiver 108 to a bus 128 or the like for communication with a transceiver 109. Any common, inexpensive transceiver may be used. An example is a XE1201 manufactured by XEMICS of Switzerland or a BethelTronix BT1073B.

Figure 10:
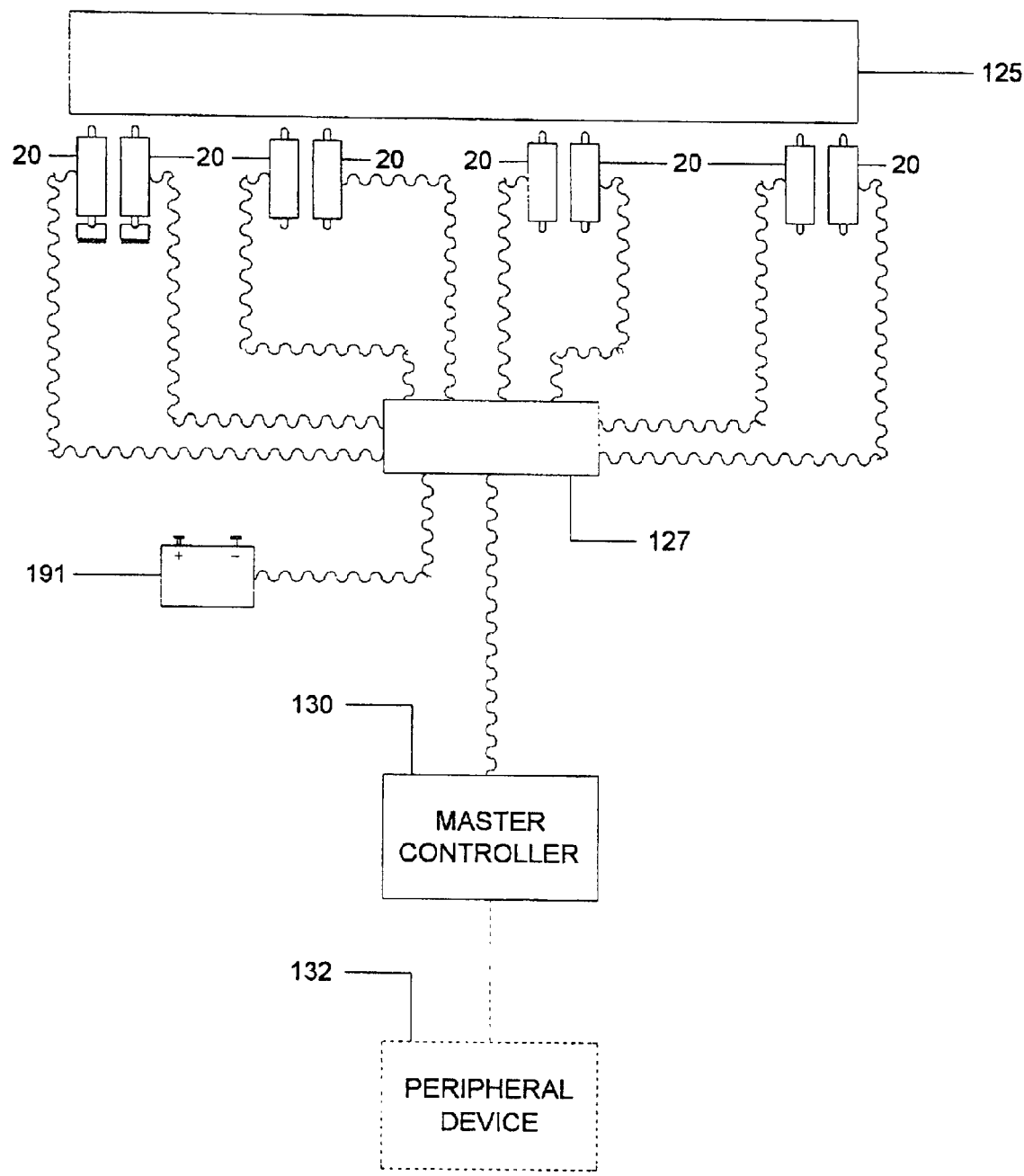
FIG. 10 is a diagram illustrating the connection of the major components of the vehicle scale of FIG. 1.

In FIG. 10 there is the junction box/concentrator 127 that consists of microprocessor 195 is provided with memory 195a including ROM, EEPROM and RAM for storage of programs and of data received from load cells 20 and transmits to the master controller 130. Microprocessor 195 is also equipped with a serial interface unit 195b connected through a driver 197 and a receiver 198 to a bus 199 or the like for communication with an RF modem 193. Any commercially available RF modem card should work in the preferred embodiment. The junction box/concentrator 127 is powered by a concentration power source 191, which in the preferred embodiment is six 12 volt batteries connected together.

Figure 11:
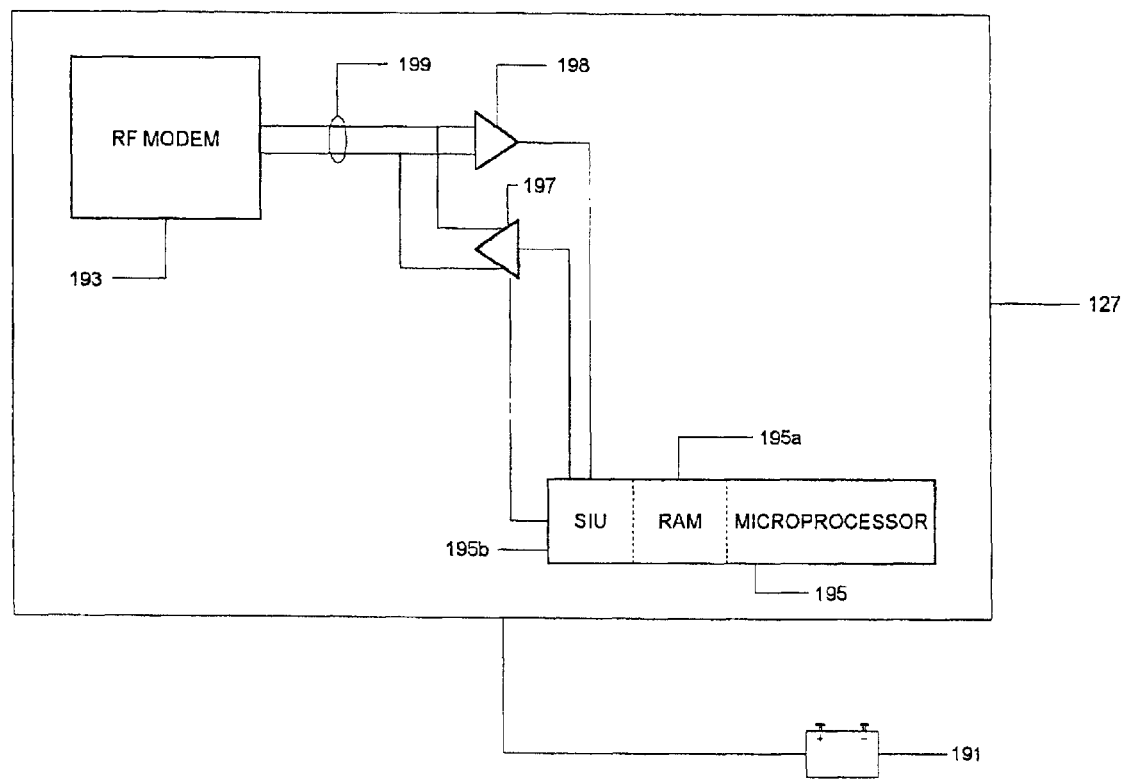
FIG. 11 is a block diagram of a preferred form of the junction box/concentrator used.
Figure 11A:
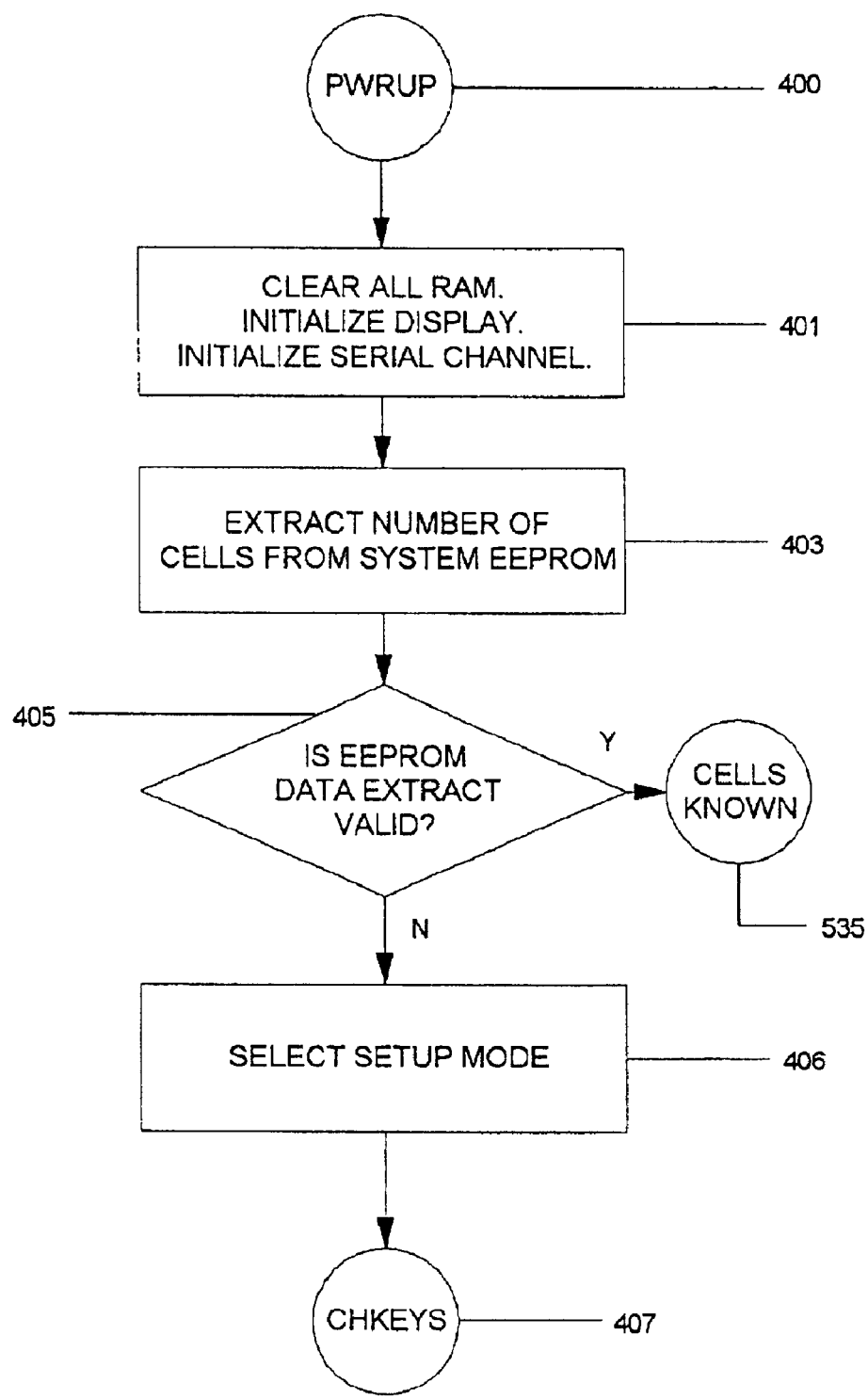
Figure 11B:
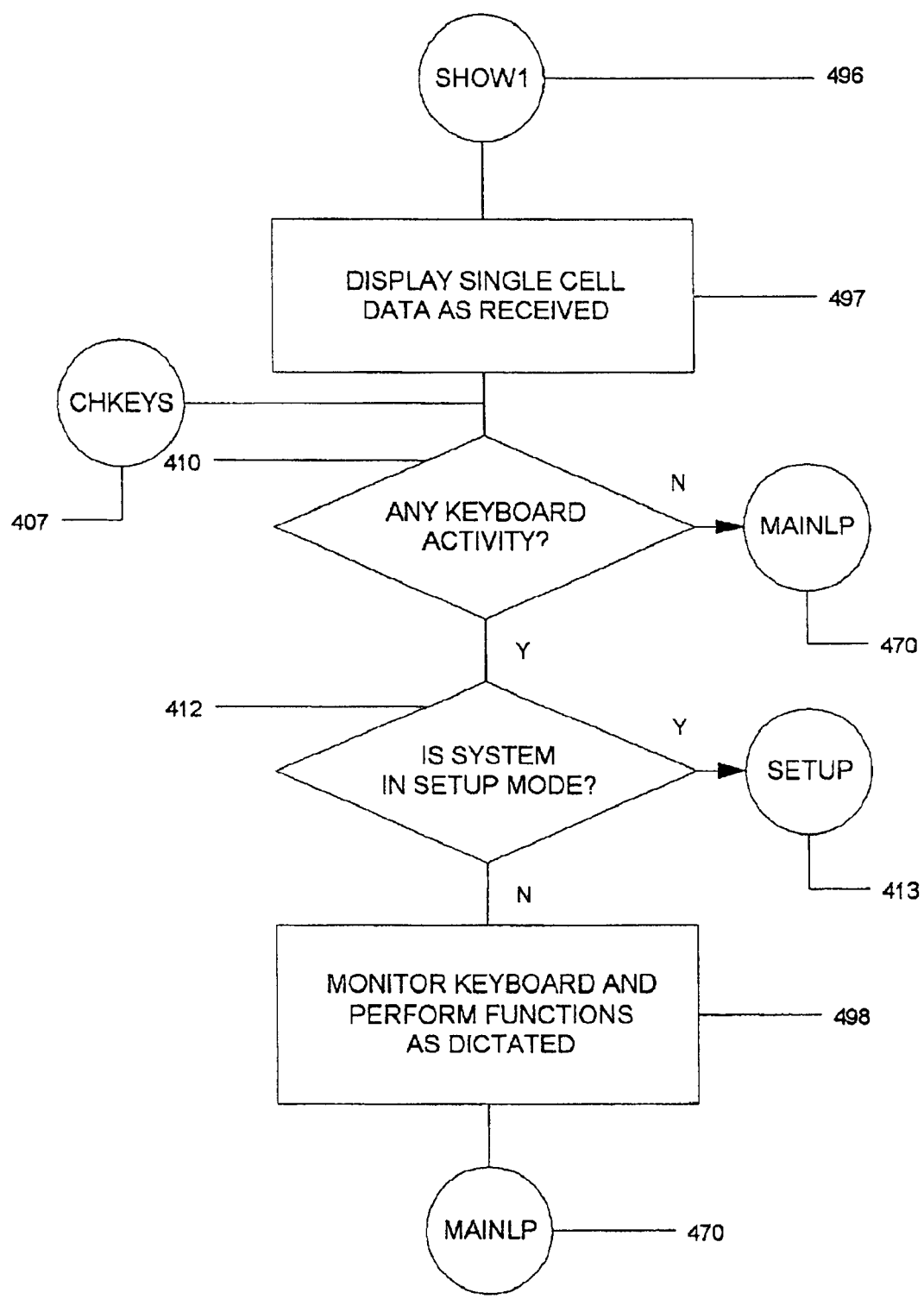

Referring to FIG. 11, there is shown a scale for weighing vehicles using multiple digital load cells. The system includes eight digital load cells 20 as described above supporting a platform 125 suitable for holding a vehicle such as a truck. The load cells 20 are connected together through RF transmissions to a junction box/concentrator 127 and RF transmission to a master controller 130. The junction box/concentrator 127 is powered by the concentrator power source 193. The master controller 130 may be connected to one or more peripheral devices 132 such as a printer or host computer.

Figure 12:
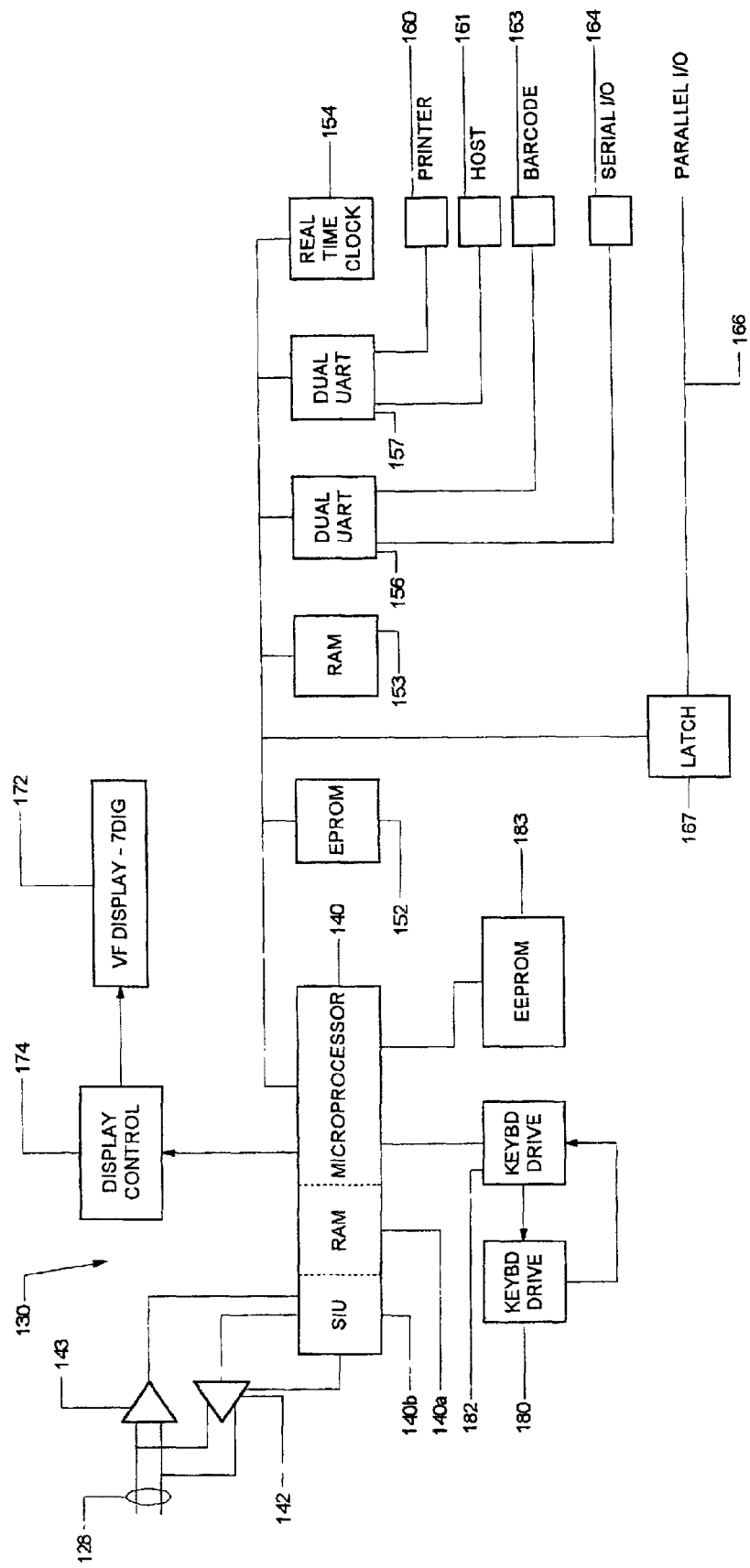
FIG. 12 is a block diagram of a preferred form of the master controller used.

As shown in FIG. 12, the master controller 130 includes a microprocessor 140, preferably an Intel 8344, provided with internal RAM memory 140a and a serial interface unit 140b. Microprocessor 140 is connected to bus 128 for communication to a RF modem 133 with the digital load cells 20 through driver 142 and receiver 143 connected to serial interface unit 140b. Any commercially available RF modem card should work in the preferred embodiment. Microprocessor 140 also communicates with an address/data bus 150 to which is connected a program memory 152, RAM 153, real time clock 154 and a pair of dual transmitters 156, 157. Transmitters 156 and 157 connect bus 150 to various peripheral devices such as a printer 160, host computer 161, bar code encoder 163 and a serial input/output line 164. A parallel input/output line 166 is also connected to bus 150 through a latch 167.

Microprocessor 140 provides weight data to a seven digit vacuum fluorescent display 172 through a display control 174. A keyboard 180 is connected to microprocessor 140 through a keyboard drive 182 for manual selection and inputting of various modes and options during calibration and set up of the system and for making slight changes in operation of the system. A nonvolatile programmable memory 183 is also connected to microprocessor 140 for the storage of various calibration constants and similar information determined during calibration and set up of the system.

The master controller 130, as shown in FIG. 1 or FIGS. 5 and 6, transmits to the junction box/concentrator 127 which polls the load cells 20 at a desired rate to receive weight data from each load cell 20. The data from each load cell 20 may be operated on in certain respects, summed with the data from other load cells 20 of the scale system of FIG. 1. In each system, single scale and multi-scale, each scale involved would require calibration and setup prior to operation.

The essential feature is that the master controller 130 receives and operates on digital information from the junction box/concentrator 127.

The master controller 130 shown in FIG. 7 is manufactured and sold by Mettler-Toledo Scale Corporation, assignee of the present application, as a Model 8530 Digital Indicator.

In operation of the systems of FIGS. 9, 10, 11 and 12 the master controller polls the load cells 20 through the junction box/concentrator 127 at a desired rate to receive weight data from each load cell. The data from each load cell may be operated on in certain respects, summed with the data from other load cells of the scale and the result further operated on to produce the final displayed weight.

Each load cell has a unique address stored in memory, which, in the latter case, allows the junction box/concentrator 127 to send commands to it only. All load cells are provided during manufacture with the same address which, if necessary, is replaced with a unique address during set up of the scale.

The digital load cell is also programmed to compensate its weight readings for temperature effects on zero and span, for span trim and for linearity and creep The compensation algorithms employed including the values of the constants are stored in the load cell memory. The values of the constants are determined during manufacture of the load cell. The constants are determined by connecting the load cell to a host computer during manufacture, subjecting the load cell to the varying weights and temperature conditions required to provide data for use in the corrective algorithms and using the data to solve for the respective constants. The constants are then transmitted by the host computer to the load cell and stored in memory.

A suitable algorithm for use in correcting linearity is:

$$W_C = DW_R(1+W_R E) \quad (1)$$

where $W_C$ is the weight corrected for linearity, $W_R$ is the uncorrected weight reading, and D and E are constants. The values of the constants are determined by taking weight readings at half load and full load and inserting the values into the equation. If $Wc_1$ and $W_{R1}$ are the values at half load and $Wc_2$ and $W_{R2}$ are the values at full load and $Wc_2$ is set equal to $W_{R2}$, then $$D=1/1+E^*W_{R2} \text{ and } E=W_{R1}-Wc_1/Wc_1^*W_{R2}-W^2_{R1}$$

The values of the constants D and E in these equations are then transmitted to the load cell for use in linearity corrections during operation.

In the preferred embodiment, the weighting apparatus 1 system will use the digital load cell methodology as presented in U.S. Pat. No. 4,804,052 which is incorporated by reference.

Power conservation is important in the current invention, a load power conserving mode is available which works by continuously monitoring the rate of change of cell output (weight reading) and restricts transmissions to a lower update rate whenever the rate of change of cell output falls below a specified threshold. Thus, whenever a cell detects a "no motion" condition, transmissions are sent at a low update rate. Immediately upon detecting a rate of change in output that exceeds a predetermined programmed threshold, the cell begins transmitting at its maximum update rate.

Figure 13A:
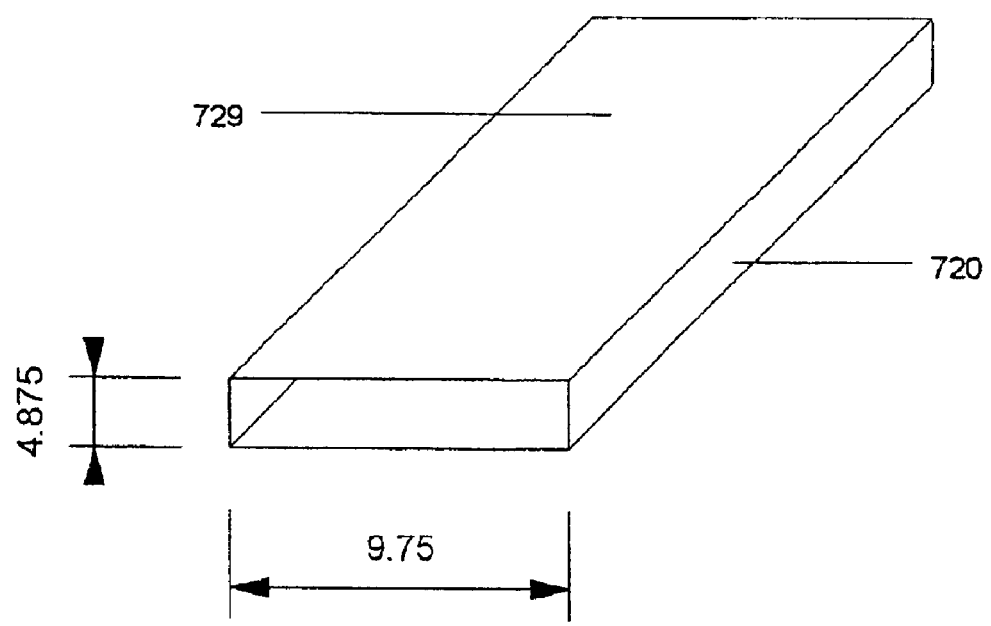
FIGS. 13a, 13b, 13c and 13d are diagrams of a waveguide.
Figure 13B:
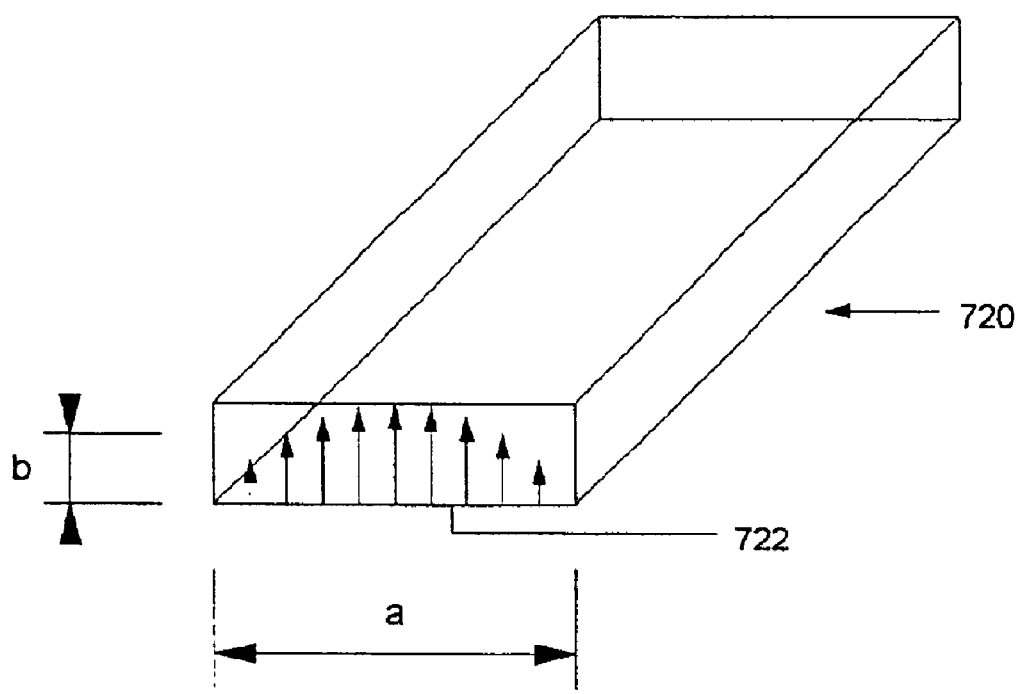

The preferred embodiment will use a waveguide 720 to reduce that power requirements of the transmissions. FIG. 13a illustrates a cross section of a conventional rectangular waveguide 720. The desired mode of propagation in such a waveguide is usually the $TE_{10}$ mode, whose electric field lines 722 are as shown in FIG. 13b. The cutoff frequency $f_c$ for this mode is $$f_c = c/2a^* \sqrt{\in_R}$$

where $\in_R$ is the relative permittivity of the dielectric filling the waveguide 720 and the term c is velocity of light constant. If the width of waveguide 720 is chosen to maintain the cutoff frequency at some desired value, then a must decrease as $\in_R$ increases. For example, WR-975 waveguide, which is designed for use with RF frequencies between 0.75 and 1.12 GHz, has a=9.75" and b=4.875". Its cutoff frequency is 0.605 GHz.

Figure 13C:
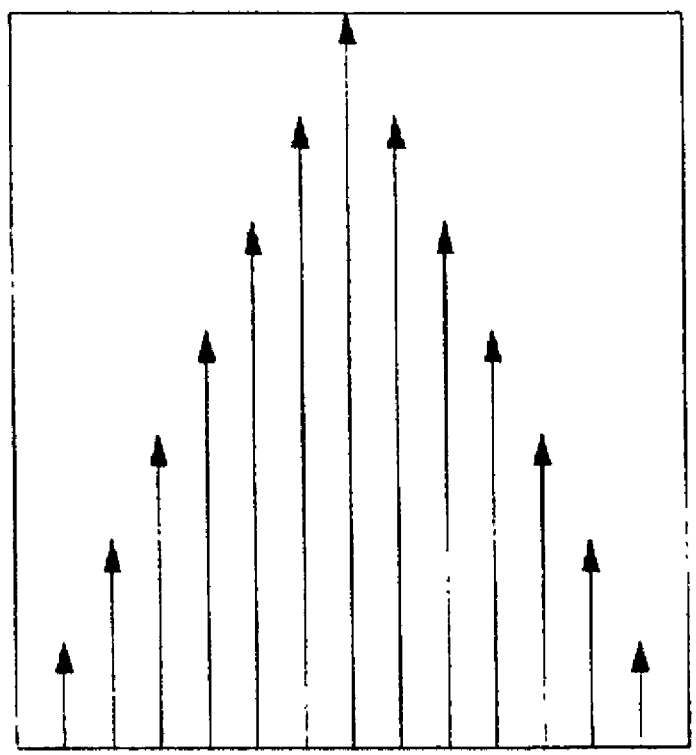

FIG. 13c depicts a conventional full-height WR-975 waveguide 727a. Conventional waveguide 727a has a cutoff frequency of 605 MHZ and a height and width respectively of: 4.875 inches and 9.75 inches.

Figure 13D:
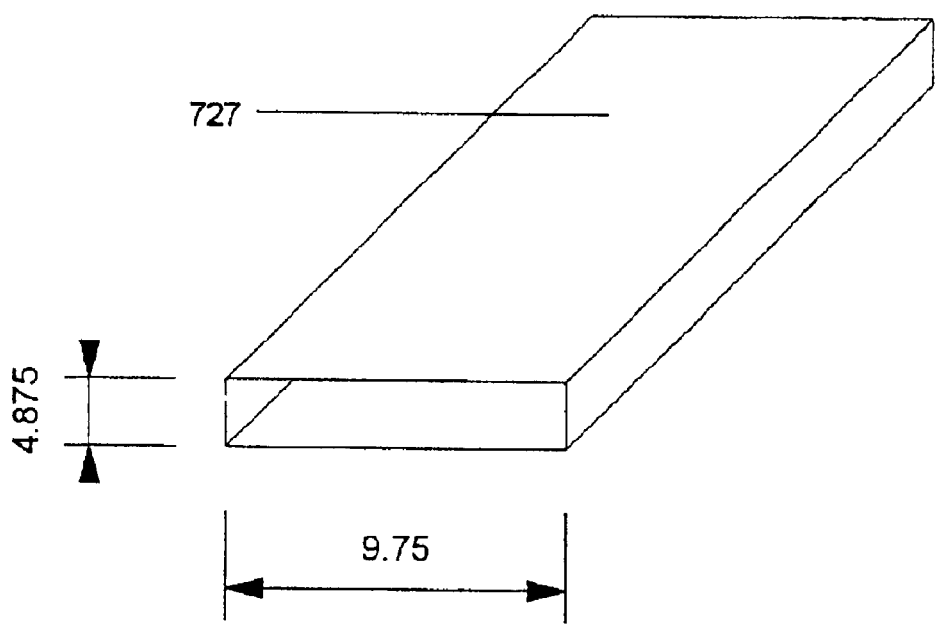

As another example, FIG. 13d depicts a conventional half-height WR-975 waveguide 729a with a cutoff frequency of 605 MHZ and a height and width respectively of: 2.4375 inches and 9.75 inches.

Figure 14:
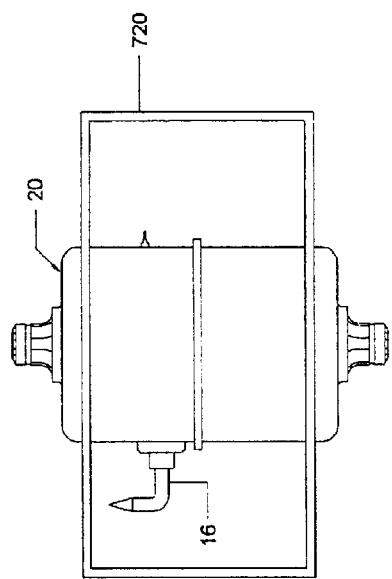
FIG. 14 is a diagram of a load cell and a waveguide.
Figure 14:
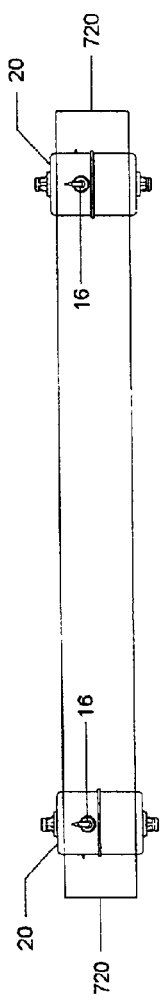

FIG. 14 shows how the load cell's antenna 16 is situated within the waveguide 720. This is to minimize the amount of energy that is needed to generate the RF transmissions. The antenna 16 is positioned well in the center of the wave guide 720. That gives it a clear path for the RF wave to travel to the junction box/concentrator 127 or to the next load cell 20.

Figure 15:
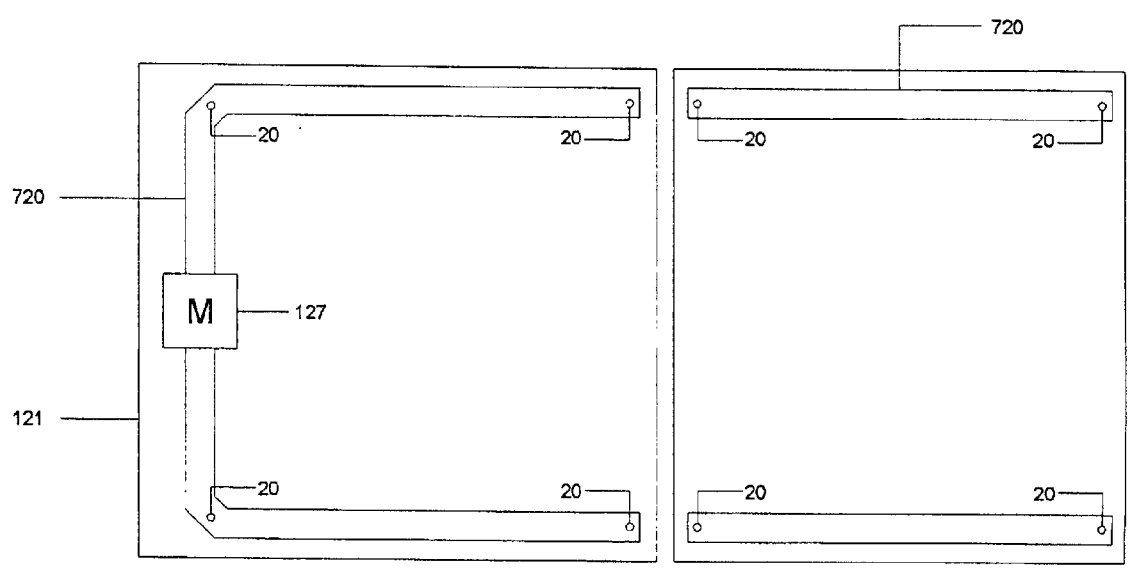
FIG. 15 is a top plan view of the waveguide in the scale.

FIG. 15 is a top view of the waveguide 720 with the antenna 16 of the load cell 20 situated in the center of the wave guide 720. The waveguides 720 are used to steer the RF energy within the scale deck structure 121. In the preferred embodiment, the frequencies of interest are between 900 mHz to 2.4 GHz. At these frequencies the waveguides 720 are reasonably sized. Channeling the RF energy between all cells is possible. Waveguides 720 must be environmentally sealed, but be permeable at the ends. Waveguides 720 could be integrated into the scale structure and would offer a pathway for RF energy and protection from external RF interference.

In the preferred embodiment, a ping is transmitted to initiate the transmit sequence. A narrow band RF signal is transmitted by the junction box/concentrator 127 and received by all the load cells 20. The Receiver is a passive network (saw filter) that detects RF energy in a certain band then causes a transmission sequence to begin. A transmission delay, pre-programmed and unique for each cell within a system, ensures that each cell has an opportunity to transmit its data. There is no two-way communication to support error-induced entry, so data redundancy and/or forward error correction will be required. This will reduce the power requirements on the system and greater increase battery life.

False Trigger Reduction Circuitry: To reduce the probability of false triggers, a unique sequence of trigger pulses will be used. Pulse reception begins when the passive network detects a start bit ping. Following the start bit ping, a sequence of one's (ping at the expected time) and zeros (absence of a ping at the expected time) is used to initiate cell transmit. The one-zero sequence is followed by a stop bit ping as in asynchronous data transmission (e.g. RS-232).

Figure 16:
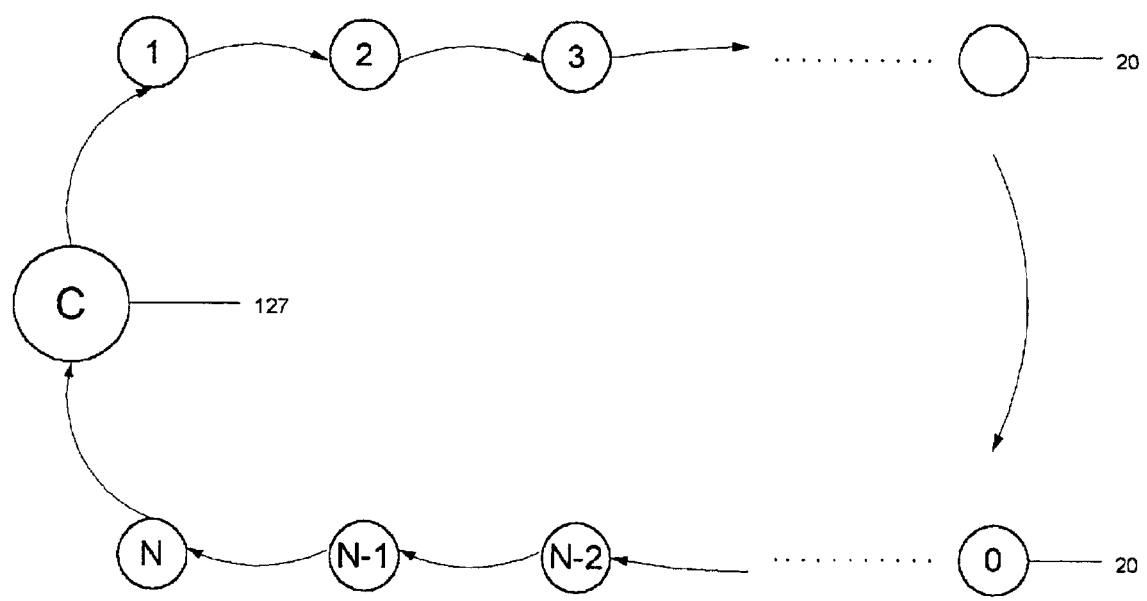
FIG. 16 is a schematic of how the signals are daisy chained from load cell to load cell to the junction box.

An alternative to this method is shown in FIG. 16. It is a schematic on how the load cells 20 communicate to each other in a daisy chain configuration with the transmission carrying the information from the prior load cells 20. The data is transmitted from load cell 20 to load cell 20 to the concentrator/junction box 127.

Figure 17A:
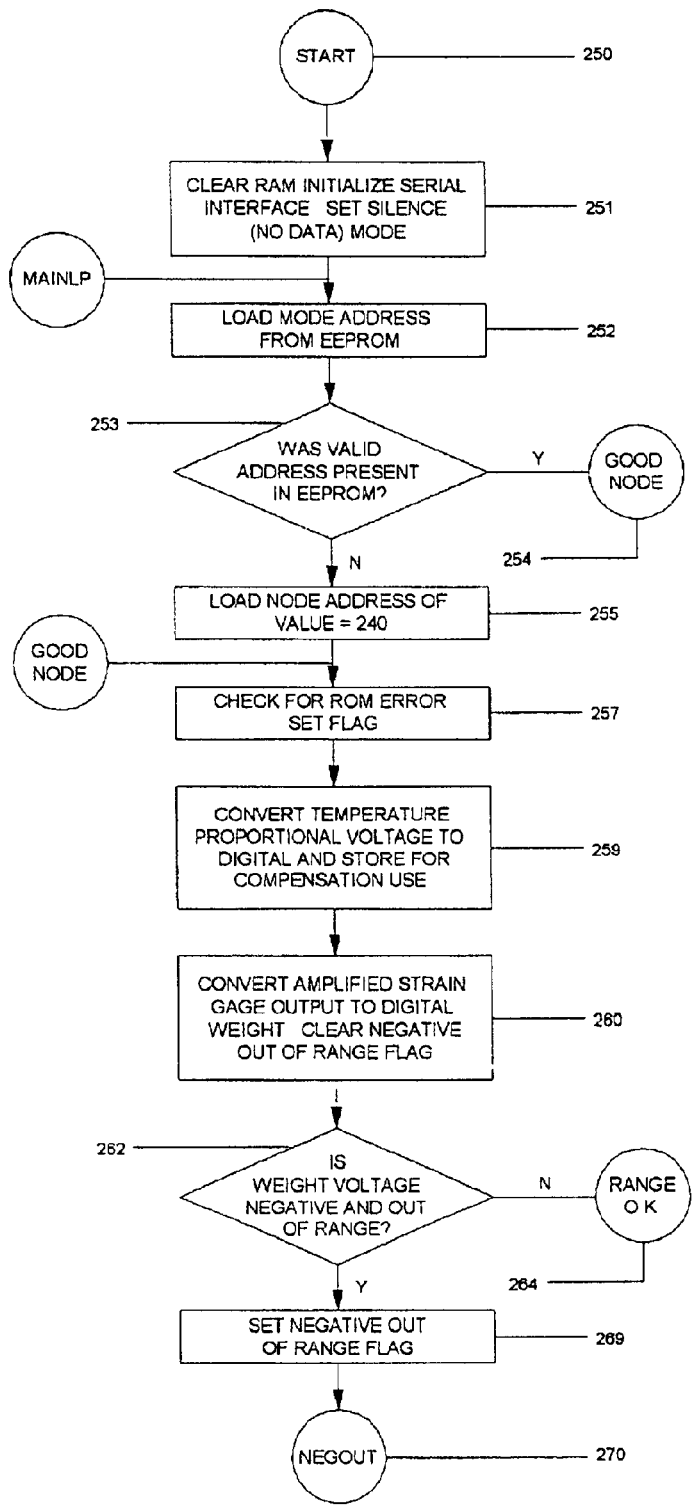
Figure 17B:
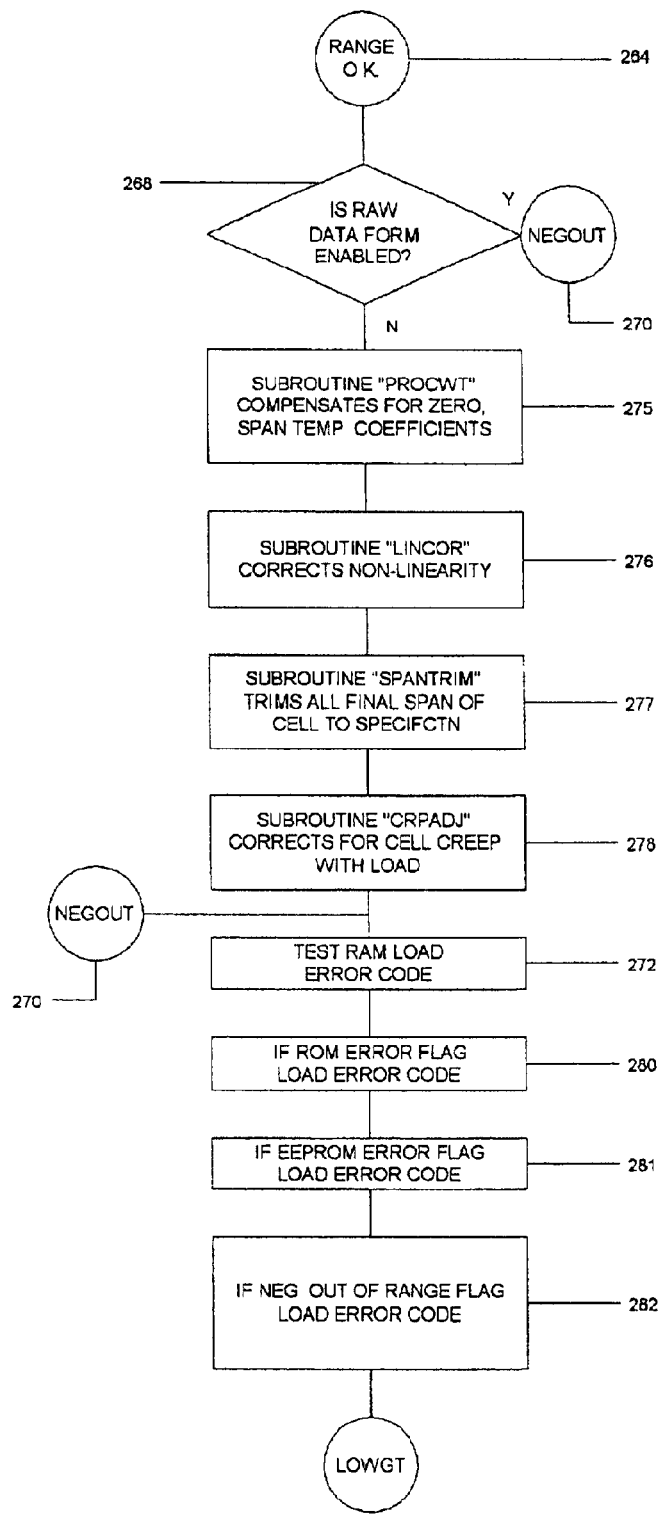
Figure 17C:
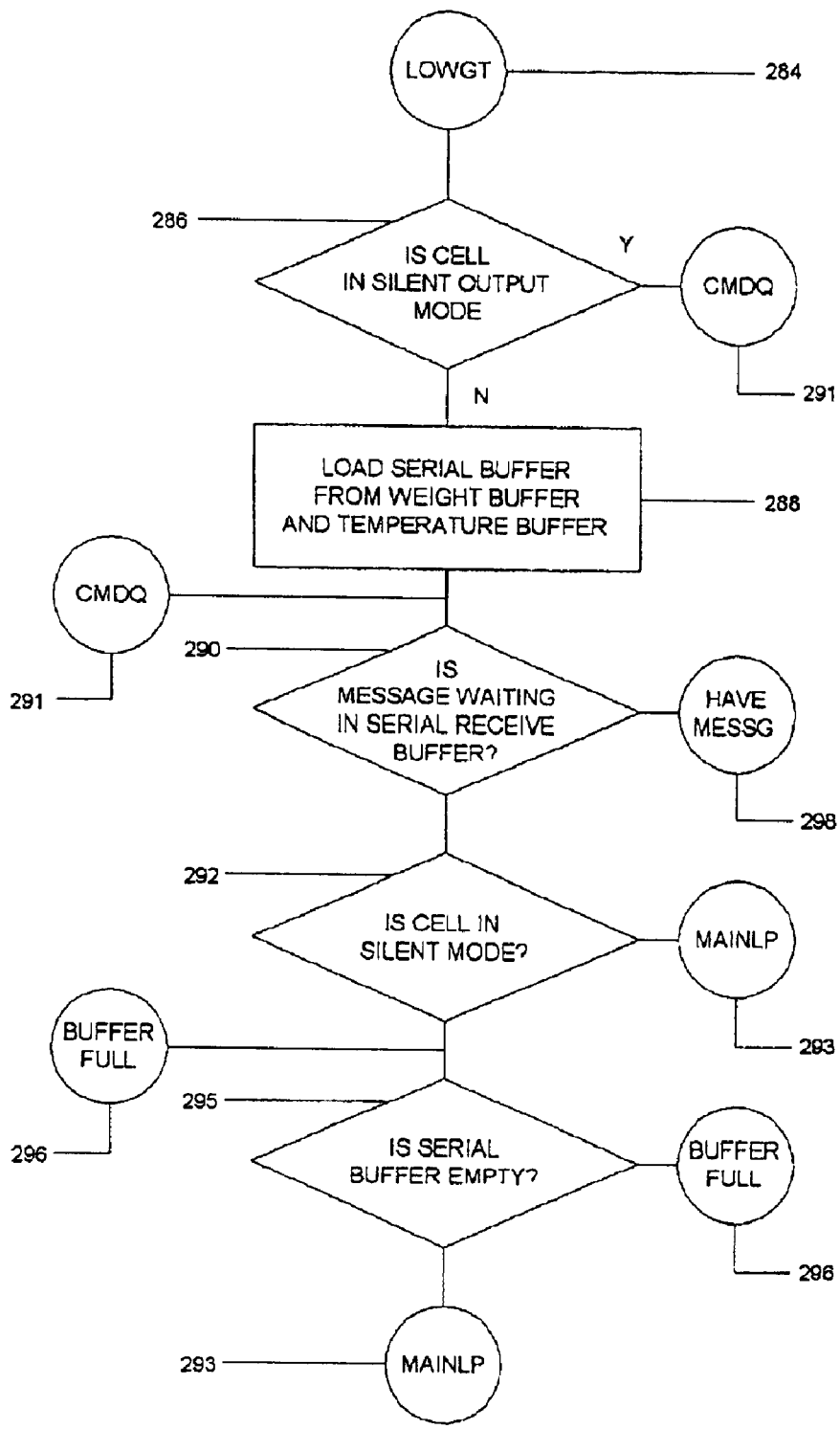
Figure 17D:
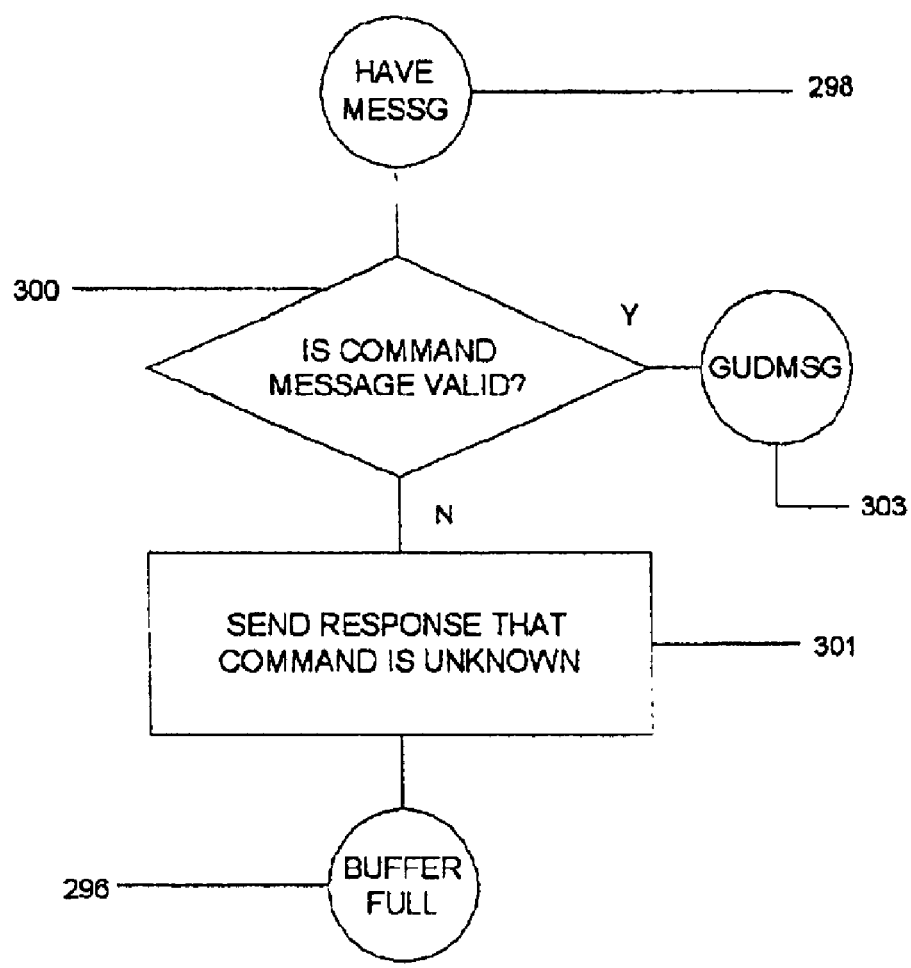
Figure 17E:
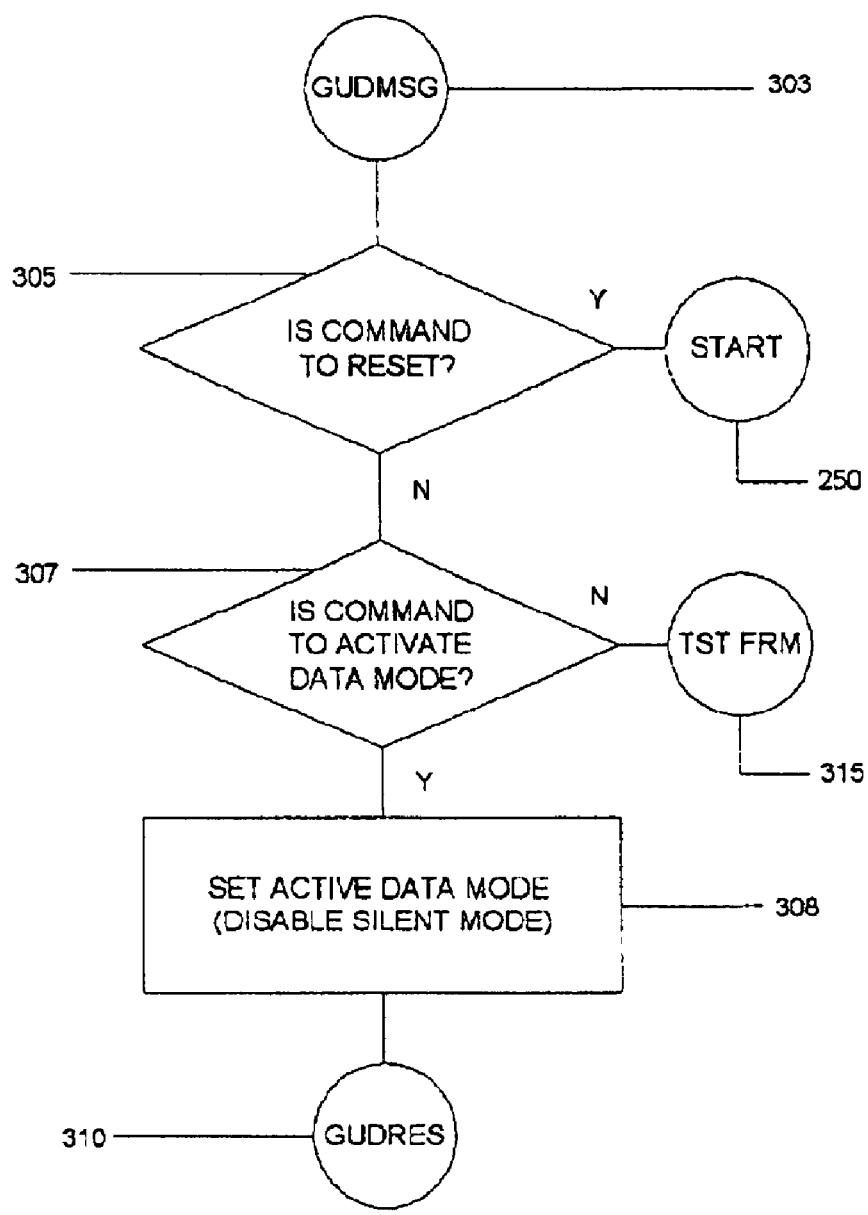
Figure 17F:
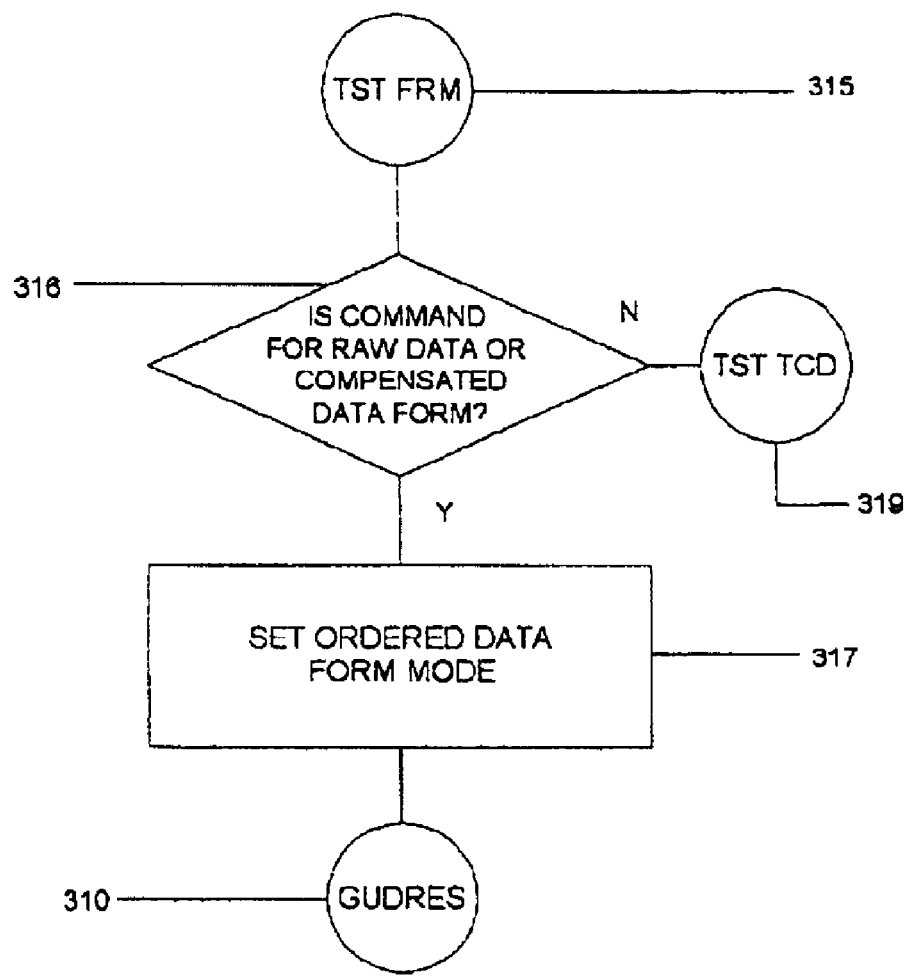
Figure 17G:
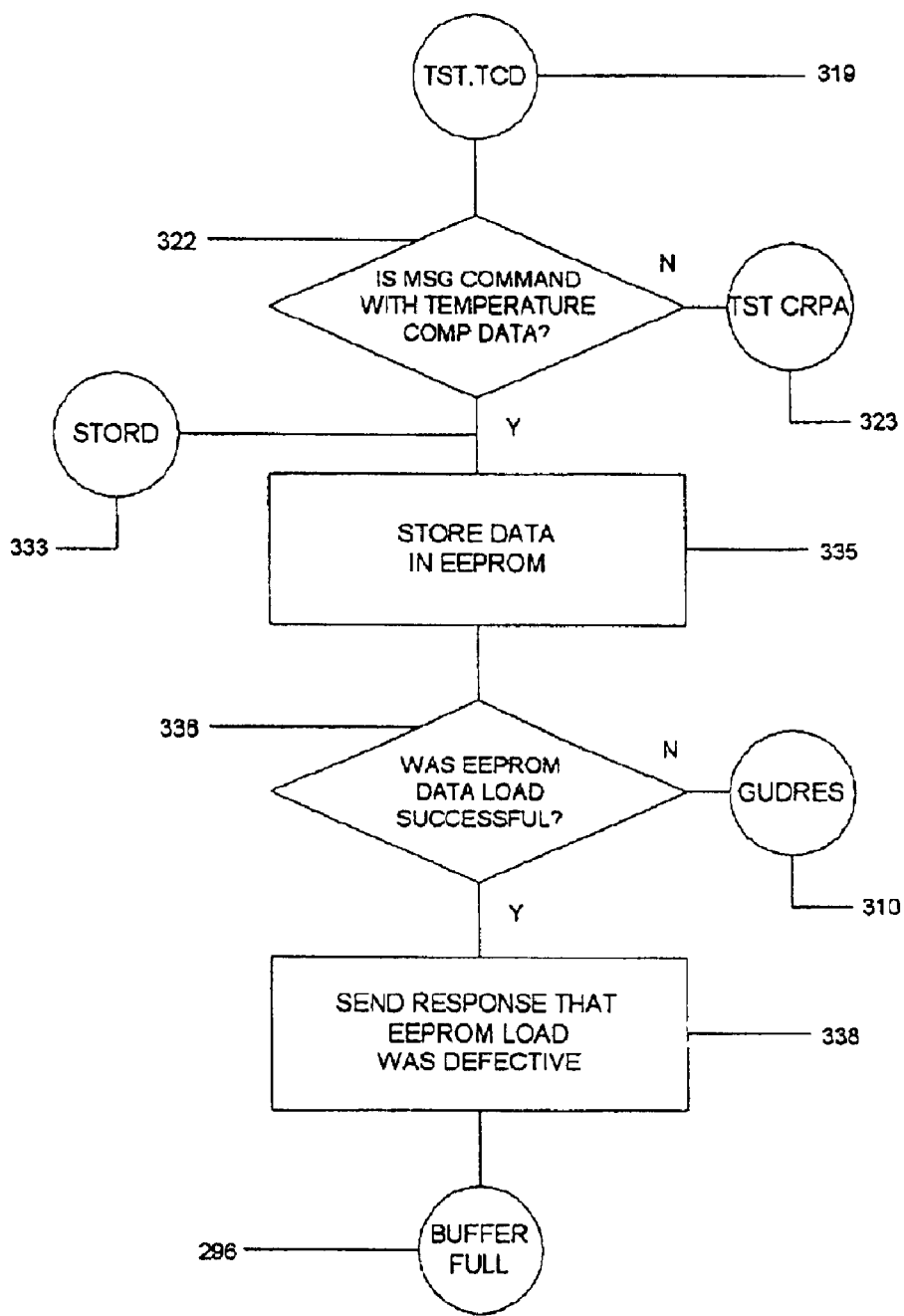
Figure 17H:
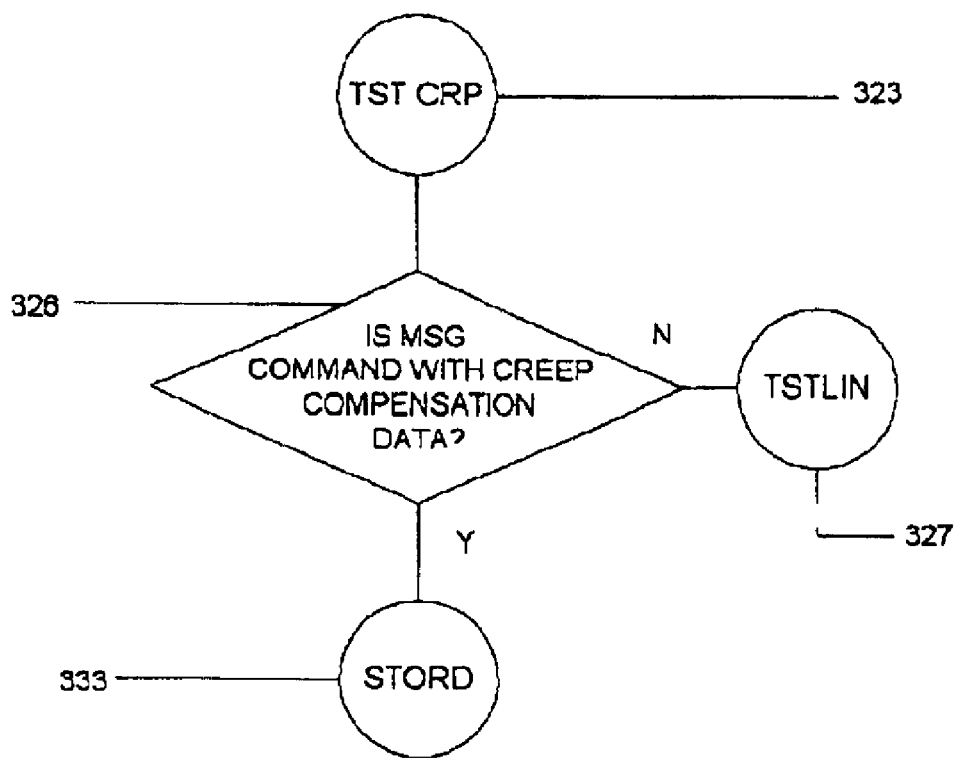
Figure 17J:
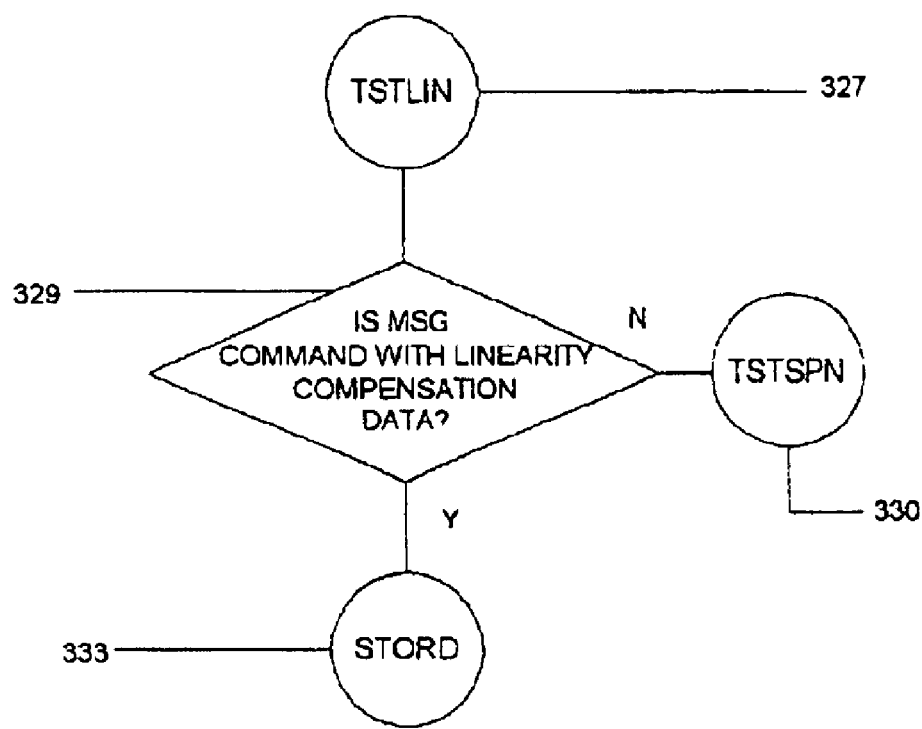
Figure 17K:
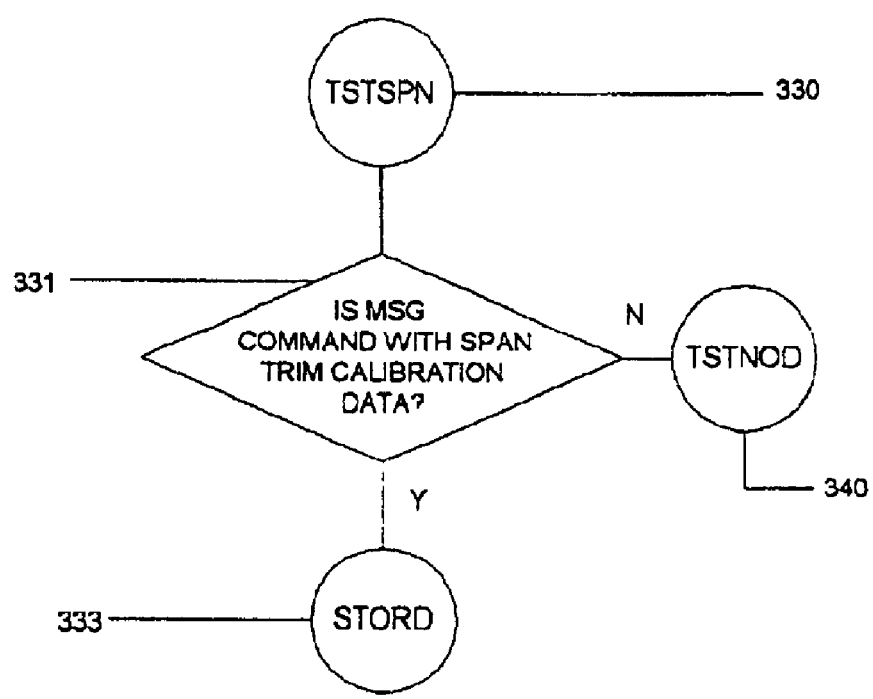
Figure 17L:
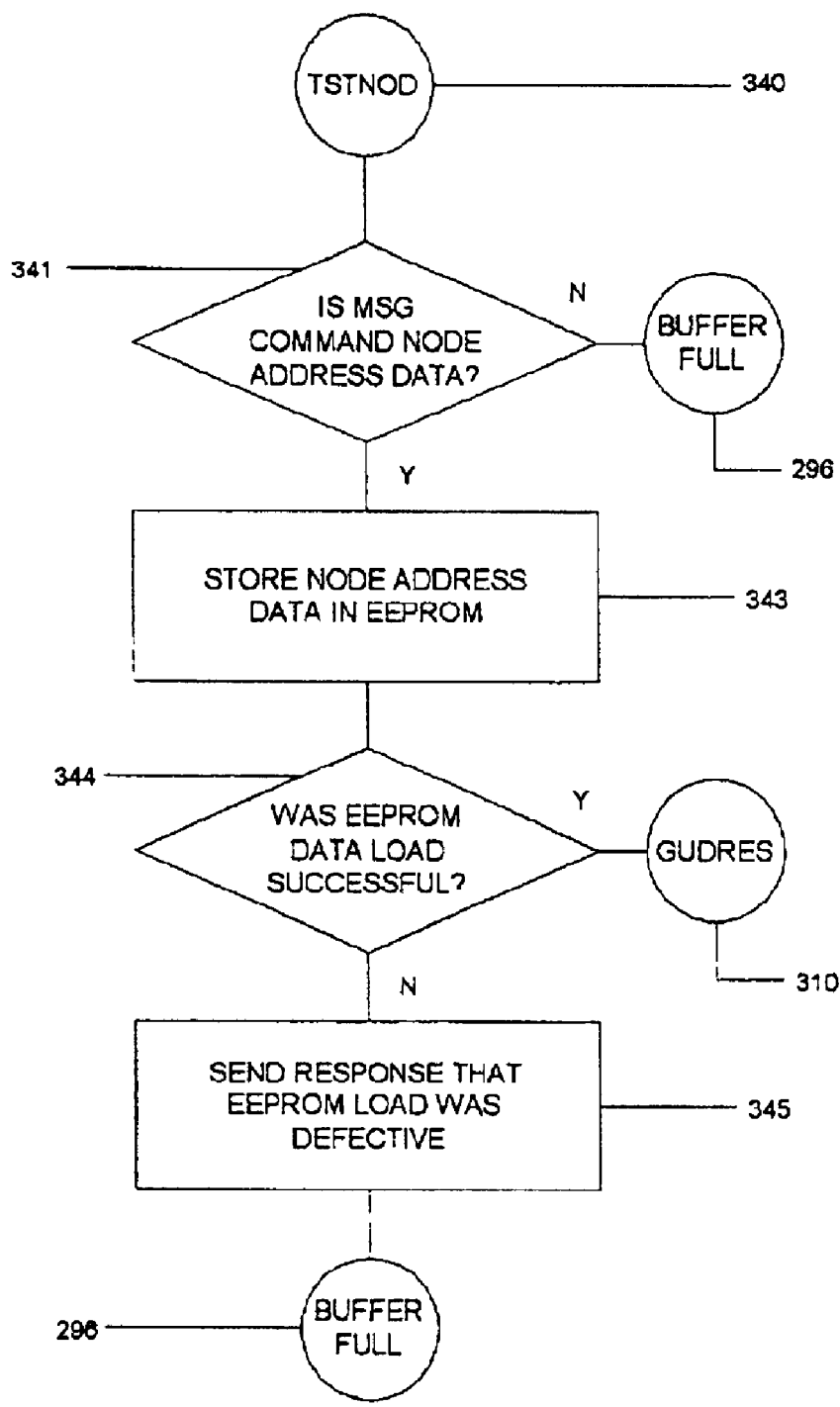
Figure 17M:
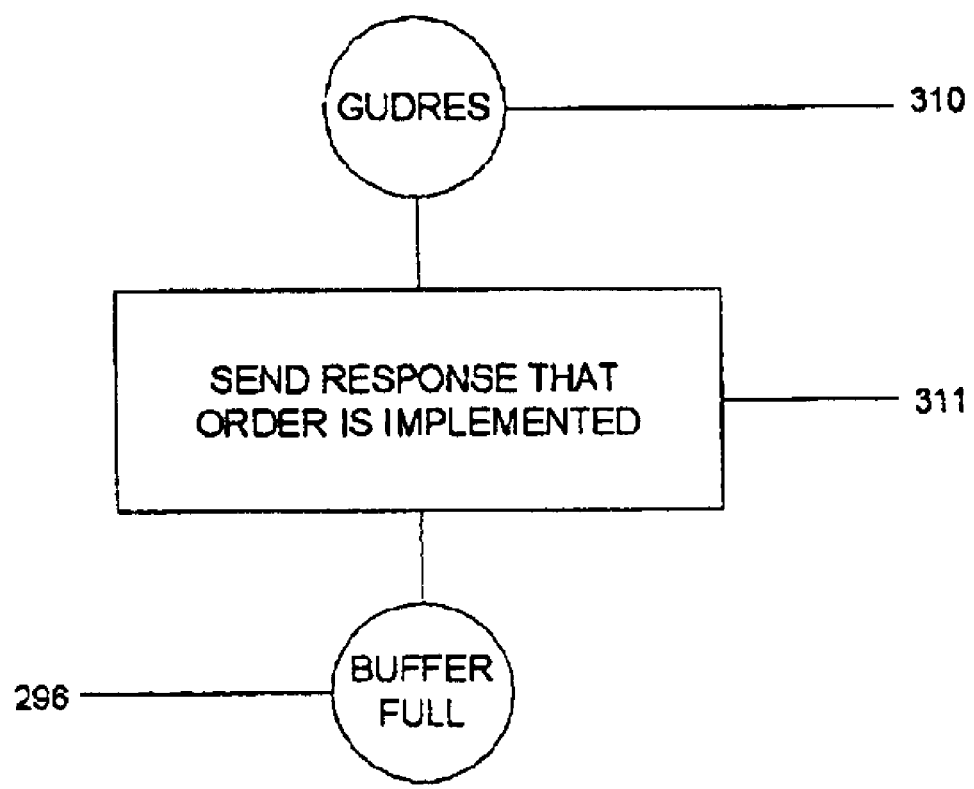

The flow chart of FIGS. 17A to 17M illustrates the operation of the digital load cell, whether connected in a single or multiple load cell system and in calibration or normal operation. After START at block 250 operation is begun in the "silent" mode at block 251 This is essentially a local mode in that the controller or host computer has not yet initiated communication with the load cell. At blocks 252 and 253 the load cell address is taken from memory and checked for validity. If the stored address was invalid an address of arbitrary value, for example, 1 or 240, is loaded at block 255. After the stored address has been determined to be valid or a new one assigned, operation proceeds directly or through point 254 to block 257 where a check is made for ROM errors and a flag is set if any such errors are found. Then, at block 259 a temperature reading is obtained from nickel resistor 82 in FIG. 5 and stored for compensation use. At block 260 a digital weight reading is taken and a negative out-of-range flag cleared. The weight reading is checked at block 262 to determine whether or not it is out of range. If not, operation proceeds through point 264 to block 268 (FIG. 17B) where a determination is made as to whether the data should be compensated or presented in its raw form. If, at block 262, the weight reading is determined to be out-of-range a flag is set at block 269 and operation proceeds through point 270 to block 272 (FIG. 17B). Likewise, if the weight reading is not to be compensated as determined at block 268 operation jumps through points 270 to block 272.

If the weight reading is to be compensated a subroutine is performed at block 275 to temperature compensate the zero and span coefficients. At block 276 a subroutine "LINCOR" is utilized to correct the weight reading for nonlinearity as will be described below. Subroutines are performed at blocks 277 and 278, respectively, to modify the weight reading according to a span trim coefficient and to correct the weight reading for creep in the load cell.

At blocks 272, 280, 281 and 282 memory errors and out-of-range data are investigated and an appropriate error code loaded if any of the conditions are found. Operation then proceeds through point 284 to block 286 (FIG. 17C) where it is determined whether or not the load cell is in the silent mode. If not, the weight and temperature readings are loaded at block 288 into a serial buffer for transmission and operation proceeds to block 290. If the load cell is in silent mode block 288 is bypassed through point 291 to block 290 where a check is made for any messages received from the junction box/concentrator 127. If there are no messages and the cell is in silent mode as determined at block 292, operation returns through point 293 to the main loop at block 252 and the operation described above is repeated. If the load cell is not in the silent mode operation proceeds from block 292 to block 295 and cycles through point 296 until the serial buffer is empty, indicating that the weight and temperature readings have been transmitted to the controller or host computer. At that time operation returns through point 293 to the main loop at block 252 (FIG. 17A).

When a message has been received as determined at block 290, operation proceeds through point 298 to block 300 (FIG. 17D) where the validity of the message is determined. If the message is not valid, a response to that effect is sent at block 301 and operation returns through point 296 to block 295. If the message is valid, as determined at block 300, operation proceeds through point 303 to block 305 (FIG. 17E) to determine the content of the message. A message command to reset causes operation to return to START point 250. If the message is a command to activate data output as determined at block 307, silent mode is disabled at block 308 in favor of an active data mode. Operation then proceeds through point 310 to block 311 (FIG. 17M) to respond to the junction box/concentrator 127 that the order is implemented. The cycle then proceeds through point 296 to block 295 (FIG. 17C) to transmit the data and return to the beginning of operation at block 252.

If the message was determined at block 307 (FIG. 17E) to be other than a command to activate data output, operation proceeds through point 315 to block 316 (FIG. 17F) to determine if the message is a command for data in raw or compensated form. If so, the ordered data mode is set at block 317, a response is made through point 310 and block 311 that the command has been implemented and operation returns through point 296 to block 295.

If the message was not a data form command as determined at block 316, operation proceeds through point 319 to a series of inquiries to determine whether or not the message is one containing compensation data, such as algorithm compensation constants, to be stored in memory. At block 322 (FIG. 17G), a determination is made as to whether or not the message includes temperature compensation data. If not, operation proceeds through point 323 to, in sequence, block 326 (FIG. 17H) to determine if the data is creep compensation data, point 327 and block 329 (FIG. 17J) to determine if the data is linearity compensation data, and point 330 and block 331 (FIG. 17K) to determine if the data is span trim calibration data. If the message is determined to contain one of the types of compensation data, operation proceeds through point 333 to block 335 (FIG. 17G) where the data is stored in memory. A check is then made at block 336 to determine if the data load was successful. If so, operation proceeds through point 310 to block 311 to respond that the message command has been implemented and then through point 296 to block 295. If the data load was not successful, a response to that effect is sent at block 338 and operation proceeds through point 296 to block 295.

It should be noted that compensation constants for correcting for temperature, creep, linearity, and span trim calibration are transmitted to the digital load cell only during set up as part of the manufacturing process. Accordingly, results of the tests described above for the presence of such data in a received message would be negative when the load cell is operating as a part of the scale system of FIGS. 9 and 10.

Referring again to FIGS. 17A to 17M, when the received message has undergone the last test for containing of data constants at block 331 (FIG. 17K), operation proceeds through point 340 to block 341 (FIG. 17L) for a determination as to whether the message includes an address assignment for the load cell. If not, operation proceeds through point 296 to block 295. If the message is an address assignment the address is stored in memory at block 343 and a check made at block 344 to determine if loading of the address was accomplished satisfactorily. When the address load was not satisfactory a response to that effect is sent at block 345 and operation proceeds through point 296 to block 295. If the address was loaded successfully as determined at block 344, operation proceeds through point 310 to block 311 (FIG. 17M) for transmission of a response that the command has been implemented. Operation then proceeds through point 296 to block 295.

It will be apparent from the foregoing description that the operation of each digital load cell in the system of FIGS. 9 and 10, once the load cell has been assigned an address and transferred from a silent mode to an active data mode, consists primarily of taking the weight and temperature readings, compensating the weight reading for various factors mentioned above and providing it to the junction box/concentrator 127.

Additional Embodiments

Figure 18:
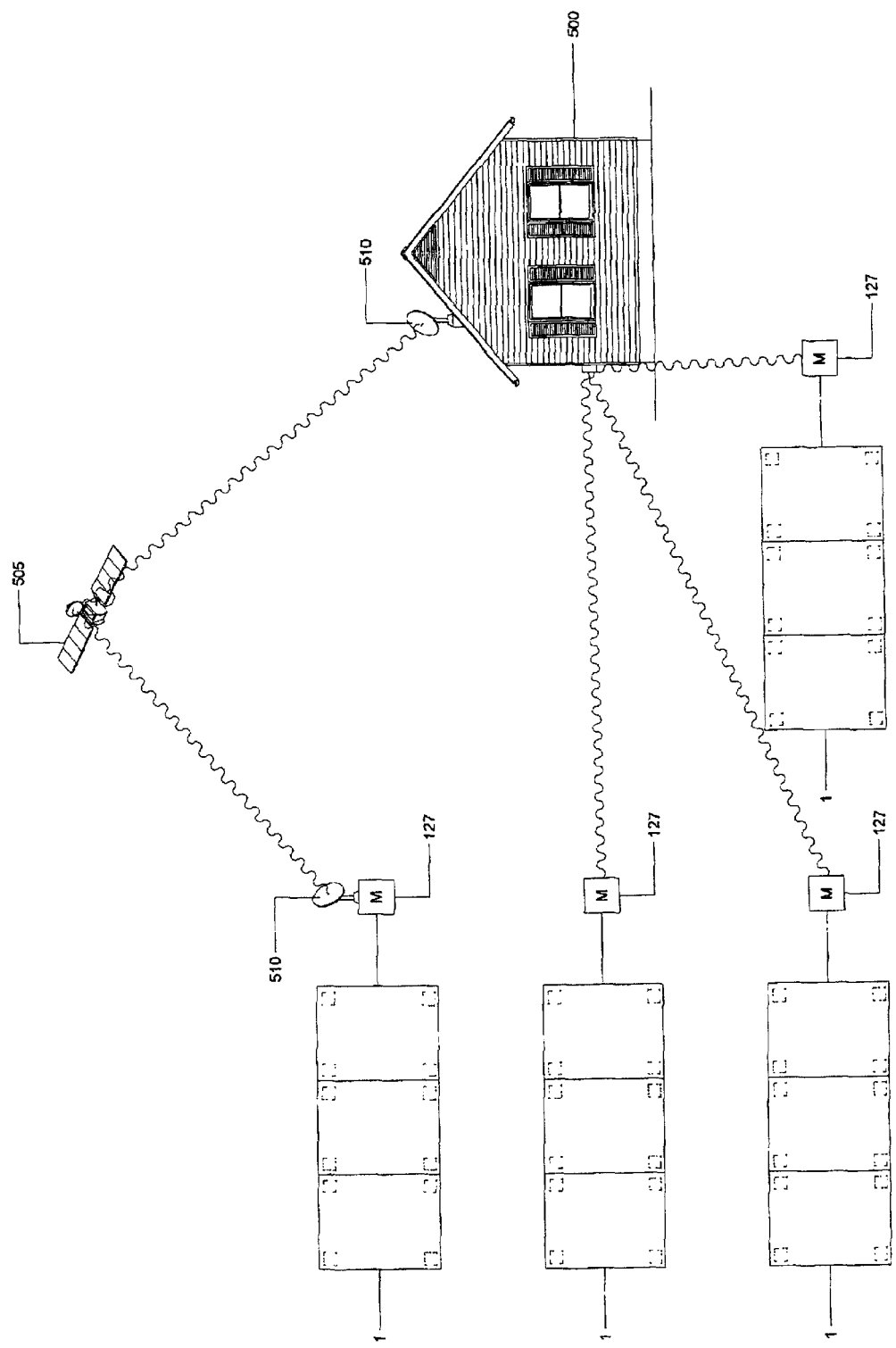
FIG. 18 is a plan diagram of a control house communicating to multiple scales.

An additional embodiment is shown in FIG. 18. This embodiment has a single control house 500 accessing and controlling multiple weighing apparatus 1 Cables do not limit the control house 500 so it can be a great distance from the weighing apparatus 1 and still function correctly. . The control house 500 and the scale 1 should be within the line of sight of each other for maximum performance. Although a satellite antenna system 510 could be used to send the signal between the control house 500 and the scale 1 where the signal is sent back and forth using a satellite 505.

In another embodiment, access to the hermetically sealed load cell to make programming changes or changes in to constants could be communication via battery supply terminals (data over power).

In another embodiment, a single or multiple load cells 20 would communicate directly to the master controller 130 without using a junction box/concentrator 127.

In an additional embodiment, the master controller 130 and/or the junction box/concentrator 127 are powered by an alternate energy source such as solar or hydroelectric power source.

ADVANTAGES

The previously described version of the present invention has many advantages The intent is to develop a scale that allows a faster, less expensive, and more efficient transmission of information and less potential for failure. Less power requirements, and better wear, and more efficient transmission of information back and forth through from the scale and the scale without the requirement of running wired communications between them. This will allow for the transmission of scale data from a single scale or multiple scales to the scale house without regards to the terrain or distance between. The present invention adds to the efficiency and productiveness of the process.

The armored cables that are required in traditional large capacity scales are expense and susceptible to being damaged, fail, pinch or rodents. The cables tend to break down due to weather changes. There are no cables to break in the present invention. In the present art, if all cables are inter connected and if one breaks in spot, the system could be affected. With no cables or wiring, the risk of lightening damage is greatly reduced since there is no wiring for the lighting to run through.

The current invention is not affected by power interruption to the large capacity scale since the power is self-sustaining.

In the present art, there was a need for anti-rotation methods, as the rotation of the load cell would produce wear on the load cell and stress on the cables. The present invention is allowed to rotate freely as there are no cables to the load cell limiting rotation. No hexes or anti-rotation devices are required if the load cell can rotate. An additional rotation advantage is it allows the wear to be distributed evenly.

There is no wire flex on dumper scale weight models.

If solar power is used to power the controller, the current invention could be set up anywhere since there are no wires or required external power sources. Since there is no limitations on the control house 500 based on the need to run cables from the control house 500 to the scale 1, the terrain and distance from the control house 500 to the scale does not need to be taken into account

CONCLUSION, RAMIFICATIONS, AND SCOPE

Although the present invention has been described in considerable detail with reference to certain preferred versions thereof, other versions are possible. For example, the RF Multiple load cell scale could use a different or new method to communicate or it may use a different power source or different ways of transmitting information from one power cell to another. Therefore, the point and scope of the appended claims should not be limited to the description of the preferred versions contained herein.

What is claimed is:

1. A weighing apparatus comprising a load cell with a wireless communication means where said wireless communication is with a junction box and said junction box uses wireless communications means to communicate with a master controller.

2. Weighing apparatus as claimed in claim 1 where said load cell has its own power source and said master controller has its own power source.

3. A method of making a load cell that has a wireless communication means where said wireless communication is with a junction box, said junction box uses wireless communications means to communicate with a master controller, said load cell has its own power source and said master controller having its own power source.

4. Weighing apparatus comprising multiple load cells with a wireless communication means where said wireless communication is with junction box and said junction box uses wireless communications means to communicate with a master controller.

5. Weighing apparatus as claimed in claim 4 where said load cell has its own power source and the control device has its own power source.

6. Weighing apparatus comprising multiple load cells with a wireless communication means where said wireless communication is with a junction box and said junction box uses wireless communications means to communicate with a master controller where a single conductor waveguide is used.

7. Weighing apparatus comprising a load cells with a wireless communication means where said wireless communication is with a junction box and said junction box uses wireless communications means to communicate with a master controller where a single conductor waveguide is used.

* * * * *